(12) United States Patent
Mizushima et al.

(10) Patent No.: US 7,969,532 B2
(45) Date of Patent: Jun. 28, 2011

(54) SURFACE ILLUMINATOR AND LIQUID CRYSTAL DISPLAY USING SAME

(75) Inventors: Tetsuro Mizushima, Osaka (JP);
Ken'ichi Kasazumi, Osaka (JP);
Kiminori Mizuuchi, Osaka (JP);
Kazuhisa Yamamoto, Osaka (JP);
Shin-ichi Kadowaki, Hyogo (JP);
Tatsuo Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 474 days.

(21) Appl. No.: 12/093,487

(22) PCT Filed: Nov. 15, 2006

(86) PCT No.: PCT/JP2006/322745
§ 371 (c)(1),
(2), (4) Date: May 13, 2008

(87) PCT Pub. No.: WO2007/058203
PCT Pub. Date: May 24, 2007

(65) Prior Publication Data
US 2009/0303417 A1    Dec. 10, 2009

(30) Foreign Application Priority Data

Nov. 15, 2005   (JP) .................................. 2005-329648

(51) Int. Cl.
*F21V 8/00*        (2006.01)
*G02F 1/1335*      (2006.01)
(52) U.S. Cl. ................ 349/65; 349/58; 349/56; 349/61; 362/97.1; 362/97.2; 362/611; 362/608
(58) Field of Classification Search .................... 349/58, 349/56, 61, 112, 65; 348/766; 362/97.1, 362/97.2, 97.3, 511, 611, 612, 259, 335, 336, 337, 608
See application file for complete search history.

(56) References Cited

U.S. PATENT DOCUMENTS 5,515,198 A    5/1996   Kusuda et al.
(Continued)

FOREIGN PATENT DOCUMENTS

JP    1-179908    7/1989
(Continued)

OTHER PUBLICATIONS

English language version of International Preliminary Report on Patentability, issued Jun. 6, 2008, in the International Application of which the present application is the U.S. National Stage.

(Continued)

*Primary Examiner* — Brian M Healy
(74) *Attorney, Agent, or Firm* — Wenderoth, Lind & Ponack, LLP.

(57) ABSTRACT

A surface illuminator has a uniform luminance over a large area by using a laser light source, has a wide color reproduction range, and is capable of suppressing a speckle noise. A liquid crystal display uses such a surface illuminator. The surface illuminator includes the laser light source that emits a laser beam; a beam scan section that deflects and scans the laser beam; and a first plate-shaped light guide that causes the laser beam deflected and scanned by the beam scan section to be incident from an end face portion and causes the incident laser beam to emit from a first major surface. Further, the liquid crystal display includes a liquid crystal display panel and the surface illuminator, wherein the surface illuminator is used as a backlight illuminator that lights the liquid crystal display panel from the backside in this liquid crystal display.

28 Claims, 16 Drawing Sheets

U.S. PATENT DOCUMENTS

| | | | |
|---|---|---|---|
| 7,177,018 B2* | 2/2007 | Seeley | 356/154 |
| 2002/0167624 A1 | 11/2002 | Paolini et al. | |
| 2005/0276566 A1* | 12/2005 | Iimura | 385/146 |
| 2009/0303417 A1* | 12/2009 | Mizushima et al. | 349/65 |

FOREIGN PATENT DOCUMENTS

| JP | 6-148635 | 5/1994 |
|---|---|---|
| JP | 7-43740 | 2/1995 |
| JP | 7-23329 | 4/1995 |
| JP | 9-325336 | 12/1997 |
| JP | 2000-221307 | 8/2000 |
| JP | 2002-42523 | 2/2002 |
| JP | 2002-56706 | 2/2002 |
| JP | 2003-35904 | 2/2003 |
| JP | 2004-333583 | 11/2004 |
| JP | 2005-64163 | 3/2005 |
| JP | 2006-73202 | 3/2006 |

OTHER PUBLICATIONS

International Search Report issued Dec. 12, 2006 in the International (PCT) Application of which the present application is the U.S. National Stage.

* cited by examiner

SURFACE ILLUMINATOR AND LIQUID CRYSTAL DISPLAY USING SAME

TECHNICAL FIELD

The present invention relates to a surface illuminator using a laser beam as a light source, and a liquid crystal display using the surface illuminator.

BACKGROUND ART

Conventionally, the surface illuminator using a cold cathode fluorescent tube as a light source is widely used as a backlight illumination in the liquid crystal display using a liquid crystal display panel. The cold cathode fluorescent tube used therein utilizes light emission of a phosphor (fluorescent material), and has a restriction in a displayable color reproduction range. Therefore, various examinations have been carried out for reproducing a further clear and natural tone. Above all, the surface illuminator for backlight using a light emitting diode (an LED element) of three colors such as red light (R-light), green light (G-light), and blue light (B-light) has been the focus. The light source using the three colors of R-light, G-light, and B-light or a multi-color LED element has a wider color reproduction range than that of the cold cathode fluorescent tube, thus making it possible to obtain a high image quality. Alternately, it is also possible to display an image by a field sequential method. Therefore, such developments are actively promoted.

For example, there is shown a structure in which, as the light source for display of the liquid crystal display using the LED elements of three colors of R-light, G-light, and B-light, the light source is divided into groups, and there is provided means for controlling to collectively turn on and turn off the light source for display for each group (see JP 2004-333583 A, for example). With this structure, a high luminance display and low power consumption are realized in the liquid crystal display not only of the field sequential method but also of a color filter method.

There is also shown a structure in which the LED elements of three colors of R-light, G-light, and B-light are arranged at three portions of an edge of an optical guide, so that each light be guided from each portion and be allowed to emit to an area corresponding to a pixel of each color of the liquid crystal display (see JP 2003-035904 A, for example). A color filter may be eliminated in this structure.

In addition, by using a semiconductor laser element having a luminance higher than that of the LED element and suitable for higher output, as a light emitting element of at least any one of the colors of three color light emitting elements, heat generation due to an increase of a drive current is suppressed and a fluctuation of characteristics is reduced. Note that this example specifically uses a red color semiconductor laser (see JP 2005-064163 A, for example).

As is shown in the example of JP 2005-064163 A, when a laser is used as the light source, it is important to realize a uniform luminance over a large area. When there is a variation in luminance, a displayed image is extremely deteriorated even though the color reproduction range becomes wider. However, there is almost no example of using a laser light source in backlight illumination, and JP 2005-064163 A neither describes nor discloses a way to realize a uniform luminance.

Further, in order to obtain an excellent image, suppression of a speckle noise is also required. The laser beams outputted from a laser has a significantly high coherence, and therefore mutual interference allows a random intensity variation to occur, thus forming the speckle noise. When the speckle noise occurs, deterioration of the image quality of the displayed image is invited. However, JP 2004-333583 A, JP 2003-035904 A, and JP 2005-064163 A mentioned above do not show a method of preventing the speckle noise, when the laser is used in the light source as the illuminator for backlight.

Note that, regarding a laser display and a laser exposure device, various studies have been carried out on the method of preventing the speckle noise. For example, in the method of preventing an occurrence of the speckle noise and making an intensity distribution of the laser beams uniform, by using an integrator lens, the integrator lens is reciprocally moved in a prescribed range (see JP 01-179908 A, for example).

JP 2004-333583 A and JP 2003-035904 A provide structures using a light emitting diode, and neither disclose nor suggest a structure and a method of performing uniform illumination over a large area by using a laser as a light source.

Further, JP 2005-064163 A describes an example of using a red color semiconductor laser, as a specific example. However in this example also, a specific method for obtaining a uniform planar illumination light by using the laser is not described at all.

Also, in the example of JP 01-179908 A, the occurrence of the speckle noise is prevented by reciprocally moving the integrator lens. However, it is impossible to use this structure disclosed therein as the illuminator for backlight of the liquid crystal display. Moreover, there is neither suggestion nor disclosure, regarding a point that the laser light source of three colors of R-light, G-light, and B-light is used.

Further, in a conventional large screen liquid crystal display, a plurality of light sources is required to be used in parallel for obtaining a sufficient luminance, because the luminance of the individual light source element is small. When a plurality of light sources is used, there is a problem that luminance unevenness is generated on its display surface, because individual initial luminance unevenness and the variation of characteristics by age-based change are individually different from each other.

In order to solve the above-described problems, the present invention is provided, and an object of the present invention is to provide a surface illuminator having a uniform luminance over a large area by using a laser light source, having a wide color reproduction range, and capable of suppressing a speckle noise, and a liquid crystal display using the same.

SUMMARY OF THE INVENTION

In order to solve the above-described problems, the present invention provides a surface illuminator, including: a laser light source that emits a laser beam; a beam scan section that deflects and scans the laser beam; and a first plate-shaped light guide (first light guide plate) to cause the laser beam which is deflected and scanned by the beam scan section to be incident from an end face portion and cause the laser beam to emit from a first major surface.

With this structure, it is possible to obtain a surface illuminator having a uniform in-surface light intensity distribution even when using a laser light source. Note that since the laser beam is guided by the first light guide while being scanned by the beam scan section, the speckle noise can be prevented when a diffusion plate or the like is disposed in the first light guide.

In addition, in the above-described structure, it may be so constituted that an optical path conversion section is further provided, for receiving the laser beam emitted from the beam scan section and emitting the received laser beam, with an optical path of the laser beam converted, wherein the laser beam emitted from the optical path conversion section is caused to be incident from the end face portion and is emitted from the first major surface by the first light guide.

With this structure, a deflection scanning angle or a distance of a reciprocal movement can be made small, thus making it possible to realize a simple structure of the beam scan section. Further, in-surface light intensity distribution can be easily made uniform.

Further, in the above-described structure, it may be so constituted that a second plate-shaped light guide (second light guide plate) for receiving the laser beam emitted from the beam scan section and guiding the laser beam to the optical path conversion section is further provided, wherein the second light guide is provided so as to laminate on the second major surface which is different from the first major surface of the first light guide, and the beam scan section and the optical path conversion section are disposed in the vicinity of the end face portion of the second light guide, the beam scan section causes the deflected and scanned laser beam to be incident on the end face portion of the second light guide, and the optical path conversion section receives the laser beam emitted from the end face portion of the second light guide.

With this structure, the laser beam generated by the laser light source can be transmitted to the optical path conversion section from the beam scan section, without allowing a leakage of light to occur in the optical path conversion section. In addition, the laser beam is not blocked even when dust is adhered to a device body, and the surface illuminator having excellent reliability can be realized.

Further, in the above-described structure, the first light guide may include a deflection sheet that deflects an advancing direction of the laser beams on the first major surface. In this case, this deflection sheet may be a diffusion plate, a lens sheet, or a prism sheet.

With this structure, it is possible to obtain the surface illuminator having a significantly uniform luminance over an entire surface of its major surface. Further, the speckle noise can also be prevented by the diffusion plate, the lens sheet, or the prism sheet, because an angle of the laser beam transmission is changed.

In addition, in the above-described structure, it may be so constituted that the beam scan section includes a reflection mirror for reflecting the laser beam and an angle adjusting mechanism for changing an angle of the reflection mirror, wherein the angle of the reflection mirror is changed by the angle adjusting mechanism to deflect and scan the laser beam.

With this structure, a deflection scanning is possible by using a small reflection mirror, thus making it possible to miniaturize the beam scan section. In addition, the luminance of the laser beam emitted from the major surface of the first light guide can be made further uniform. Moreover, it is possible to easily design the structure using a hologram optical element and a semi-transmissive mirror.

In addition, in the above-described structure, it may be so constituted that the beam scan section includes at least either one of a cylindrical lens and a lenticular lens, and a reciprocally moving mechanism for reciprocally moving at least either one of the cylindrical lens and the lenticular lens in a direction parallel to the end face portion of the first light guide, and the deflection scanning is executed by the reciprocal movement of the reciprocally moving mechanism. In this case, the optical element may be further provided in the beam scan section, whereby the laser beam is shaped into a beam spread in the direction parallel to the major surface of the light guide.

With this structure, the distance of the reciprocal movement of the cylindrical lens or the lenticular lens of the beam scan section can be made small, thus making it possible to further simplify the structure of the beam scan section. In addition, by reciprocally moving the beam in the beam scan section after when the laser beam is shaped into a flat beam, the speckle noise can be suppressed. Note that as the optical element for shaping the laser beam into the flat beam, a lens may be disposed in front of the cylindrical lens or the lenticular lens.

Further, it may be so constituted that the beam scan section includes a vertical angle oscillation mechanism for oscillating an emission angle of the laser beam in a vertical direction to the first major surface of the first light guide, and the deflection scanning is executed by the oscillation of the emission angle by the vertical angle oscillation mechanism.

With this structure, by oscillating and scanning the emission angle of the laser beams in the vertical direction also, the speckle noise can be suppressed.

Further, in the above-described structure, the optical path conversion section may further include the optical element for almost parallelizing the advancing direction of the incident laser beam.

With this structure, almost all laser beams made to be incident on the first light guide can be made to be a parallel light. Therefore, the hologram optical element and the semi-transmissive mirror, or the diffusion plate can be easily designed.

In addition, in the above-described structure, it may be so constituted that the first light guide further includes a plurality of hologram optical elements arranged at a prescribed pitch, and the hologram optical elements perform color separation of the laser beam by diffracting the laser beam made to be incident to the first light guide, according to the wavelength of the laser beam. The hologram optical elements constitute a plurality of rows extending in a direction vertical to a propagation direction of the laser beam in the first light guide, and a diffraction efficiency of the rows of the hologram optical elements may be differentiated so as to be changed for each row at a specific ratio, along the propagation direction of the laser beams in the first light guide.

With this structure, the light of a prescribed emission wavelength can be separated and extracted from one of major surface. In addition, by changing the diffraction efficiency of the hologram optical elements gradually, a uniform luminance can be obtained over the entire surface of the major surface.

In addition, in the above-described structure, it may be so constituted that the laser light source includes the light source emitting light of at least red laser beam, green laser beam, and blue laser beam, so that the laser light source can multiplex the red laser beam, the green laser beam, and the blue laser beam and emit them to the beam scan section.

With this structure, the beam scan section can be made to be one component. Note that, in this structure also, when the timing of emitting the laser beam of each color is differentiated, not only the red color, green color, and the blue color can be extracted from major surface of the first light guide, but also illumination light having various colors can be extracted therefrom.

In addition, in the above-described structure, it may be so constituted that the laser light source includes the light source emitting the laser beams having different wavelengths from one another and including at least the red laser beam, the green laser beam, and the blue laser beam, and the deflection scanning is individually performed by the beam scan section to the respective laser beams having different wavelengths from one another.

With this structure, the beam scan section is respectively disposed to the light source of each color, and therefore the color emitted from the first light guide can be freely selected.

In addition, in the above-described structure, it may be so constituted that the beam scan section deflects and scans the laser beams having different wavelengths from one another, so that the deflected and scanned laser beams having different wavelengths from one another may propagate through mutually different regions in the first light guide.

With this structure, the color emitted from major surface of the first light guide can be selected for each place.

In addition, in the above-described structure, it may be so constituted that the first light guide includes a plurality of sub-light guides of the same number as the number of kinds of the wavelengths included in at least the laser beams having different wavelengths from one another, and the plurality of sub-light guides include a plurality of semi-transmissive mirrors arranged at a specific pitch, so that only the laser beam having the same wavelength may propagate through the one of the plurality of sub-light guides and the laser beam made to be incident on the first light guide are partially reflected by the semi-transmissive mirror, which are then emitted from the first major surface of the first light guide. In this case, the semi-transmissive mirrors constitute a plurality of rows extending in the direction vertical to the propagation direction of the laser beam in the first light guide, and reflectances of the rows of the semi-transmissive mirror are gradually changed for each row step by step, along the propagation direction of the laser beam in the first light guide.

With this structure, the laser beam of a prescribed color can be separated and extracted from major surface in a row shape. In addition, by changing the reflectance of the semi-transmissive mirror step by step, a uniform luminance can be obtained over the entire surface of major surface. These reflectances can be designed respectively based on the number of arrangements of the semi-transmissive mirrors.

Further, the present invention provides a liquid crystal display, having a liquid crystal display panel and a backlight illuminator that illuminates the liquid crystal display panel from backside, with the backlight illuminator including a laser light source that emits a laser beam, a beam scan section that deflects and scans the laser beam, and a first plate-shaped light guide that causes the laser beam which is deflected and scanned by the beam scan section to be incident from the end face portion and causes the incident laser beams to emit from the first major surface, and a first major surface of the first light guide of the backlight illuminator and the liquid crystal display panel are disposed closely in contact with each other, so that the laser beam emitted from the first major surface can illuminate the liquid crystal display panel.

With this structure, by using the laser light source, it is possible to obtain the liquid crystal display provided with the backlight illuminator having a uniform luminance over a large area. Further, the laser light source has a wavelength of excellent color purity, and therefore a displayable color reproduction range is widened, thus making it possible to reproduce further vivid natural tone. In addition, the laser light source has a high efficiency for light emission, and therefore low power consumption is realized.

Further, in the above-described structure, it may be so constituted that the backlight illuminator includes the optical path conversion section that receives and emits the laser beam emitted from the beam scan section, with its optical path converted, so that the laser beam emitted from the optical path conversion section is caused to be incident to the end face portion and caused to emit from the first major surface by the first light guide.

With this structure, the backlight illuminator can be miniaturized, even when the liquid crystal display panel has a screen for display of a large area.

Further, in the above-described structure, it may be so constituted that the backlight illuminator further includes a second plate-shaped light guide that receives the laser beam emitted from the beam scan section and guides the laser beam to the optical path conversion section, wherein the second light guide is provided so as to laminate on a second major surface which is different from the first major surface of the first light guide, and the beam scan section and the optical path conversion section are disposed in the vicinity of the end face portion of the second light guide, so that the deflected and scanned laser beam is caused to be incident on the end face portion of the second light guide by the beam scan section, and the laser beam emitted from the end face portion of the second light guide is received by the optical path conversion section.

With this structure, the laser beam is not blocked by dust or the like, thus making it possible to stably maintain the uniform luminance.

Further, in the above-described structure, it may be so constituted that the first light guide includes a deflection sheet for deflecting the advancing direction of the laser beam on the first major surface. In this case, the deflection sheet may include at least any one of the diffusion plate, the lens sheet, and the prism sheet.

With this structure, the optical paths of the scanned laser beams incident on the diffusion plate or the like are changed at various angles, thus making it possible to reduce the speckle noise.

Further, in the above-described structure, the optical path conversion section may further include an optical element that almost parallelizes the advancing direction of the incident laser beams.

With this structure, the laser beams incident on the first light guide are almost parallelized, and therefore the hologram optical element, the semi-transmissive mirror, the diffusion plate or the like can be easily designed, and the laser beams having uniform luminance can be emitted from the backlight illuminator.

Further, in the above-described structure, it may be so constituted that the second major surface of the first light guide of the backlight illuminator includes a reflection surface having irregularity whereby the laser beam is reflected and the laser beam is emitted from the first major surface.

With this structure, a use efficiency of the laser beam can be improved.

Further, in the above-described structure, it may be so constituted that the beam scan section includes a reflection mirror for reflecting the laser beam and an angle adjusting mechanism for changing an angle of the reflection mirror, so that the laser beam is deflected and scanned, with the angle of the reflection mirror changed by the angle adjusting mechanism.

With this structure, the reflection mirror can be prepared with an extremely small shape by using, for example, a micro-electro-mechanical system (MEMS) technique, and a miniaturized and simple structure of the beam scan section can be realized.

Further, in the above-described structure, it may be so constituted that the beam scan section further includes a vertical angle oscillation mechanism for oscillating an emission angle of the laser beam in a direction vertical to the first major surface of the first light guide surface, so that a deflection scanning may be executed by the oscillation of the emission angle by the vertical angle oscillation mechanism.

With this structure, the speckle noise can be suppressed.

Further, in the above-described structure, it may be so constituted that the beam scan section includes at least one of the cylindrical lens and the lenticular lens, and the reciprocally moving mechanism for reciprocally moving the at least one of the cylindrical lens and the lenticular lens in a direction parallel to the end face portion of the first light guide, wherein the deflection scanning is executed by the reciprocal movement of the reciprocally moving mechanism.

With this structure, the luminance can be made uniform and the speckle noise can be reduced.

Further, in the above-described structure, the liquid crystal display panel is provided with pixels including a plurality of sub-pixels for displaying different colors from one another for each pixel to form a color image, and the first light guide includes a launching element for emitting the laser beam corresponding to the color to be displayed by the sub-pixel from the first major surface. In this case, as the structure of the launching element, the first light guide further includes a plurality of hologram optical elements arranged at a pitch corresponding to the row of the pixels included in the liquid crystal display panel, and the pixels of the liquid crystal display panel include a red color pixel part for displaying red color, a green color pixel part for displaying green color, and a blue color pixel part for displaying blue color, wherein the hologram optical elements carry out color separation of the laser beams by diffracting the laser beams incident on the first light guide according to the wavelengths of the laser beams, so that the laser beams having different wavelengths from one another may be incident on the red color pixel part, the green color pixel part, and the blue color pixel part, respectively. Further, the hologram optical elements may constitute a plurality of rows extending in a direction vertical to the propagation direction of the laser beam in the first light guide, and a diffraction efficiency of the rows of the hologram optical elements may be respectively differentiated so as to be changed for each row at a specific ratio, along the propagation direction of the laser beams in the first light guide.

With this structure, the red color pixel part, the green color pixel part, and the blue color pixel part constituting a pixel row of the liquid crystal display panel can be irradiated with R-light, G-light, and B-light, respectively, thus making it possible to eliminate a color filter. By removing the color filter, further bright display can be obtained.

Further, in the above-described structure, it may be so constituted that the laser light source includes a light source that emits at least red laser beam, green laser beam, and blue laser beam, and by this laser light source, the red laser beam, the green laser beam, and the blue laser beam are multiplexed and emitted to the beam scan section. Alternately, it may be so constituted that the laser light source includes the light source that emits the laser beams having different wavelengths from one another and including at least red laser beam, green laser beam, and blue laser beam, and each laser beam having different wavelengths from one another is individually deflected and scanned by the beam scan section.

With this structure, the liquid crystal display having an excellent color reproduction property can be realized.

Further, in the above-described structure, it may be so constituted that the beam scan section deflects and scans the laser beams having different wavelengths from one another, so that the deflected and scanned laser beams having different wavelengths from one another may propagate through mutually different regions in the first light guide at the same time. In this case, it may be so constituted that the liquid crystal display panel includes a plurality of pixels, so that a laser beam having a first wavelength included in the laser beams having different wavelengths from one another is made to be incident on a pixel at a first time, and a laser beam having a second wavelength included in the laser beams having different wavelengths from one another is made to be incident on the pixel at a second time, so that a plurality of colors are displayed by one pixel.

With this structure, by continuously scrolling and lighting red color, green color, and blue color, for example, an image having excellent color reproduction property can be displayed without a color filter.

Further, in the above-described structure, it may be so constituted that the first light guide includes a plurality of sub-light guides of the same number at least as the number of kinds of the wavelengths included in the laser beams having different wavelengths from one another, and the pixels of the liquid crystal display panel include a red color pixel part for displaying red color, a green color pixel part for displaying green color, and a blue color pixel part for displaying blue color, and the plurality of sub-light guides include a plurality of semi-transmissive mirrors arranged at a specific pitch, so that only the laser beams each having same wavelength are propagated through a sub-light guide of the plurality of sub-light guides, and laser beams incident on the first light guide are partially reflected by the semi-transmissive mirrors, which are then emitted from the first major surface of the first light guide, and the laser beams emitted from the first major surface are made to be incident on the red color pixel part of a pixel, the green color pixel part of a pixel, and the blue color pixel part of a pixel. In this case, the semi-transmissive mirrors constitute a plurality of rows which extend in a direction vertical to the propagation direction of the laser beams in the first light guide, and the reflectances of the rows of the semi-transmissive mirrors are gradually changed for each row step by step, along the propagation direction of the laser beams in the first light guide.

With this structure, the red color pixel part, the green color pixel part, and the blue color pixel part constituting the pixel rows of the liquid crystal display panel can be irradiated with R-light, G-light, and B-light, respectively, thus making it possible to eliminate the color filter. By removing the color filter, further bright display can be obtained.

Further, in the above-described structure, it may be so constituted that the liquid crystal display panel includes the pixel, and also includes at least any one of the diffusion plate, the lens sheet, and the prism sheet, in a lower stream side of the pixel along with the advancing direction of the laser beams.

With this structure, the scanned and incident laser beams can be visually recognized, with their angles changed, thus making it possible to reduce the speckle noise and obtain an excellent image quality.

In addition, the present invention provides a surface illuminator, including: a laser light source that emits laser beams; and a first plate-shaped light guide (first light guide plate) for making the laser beams to be incident from the end face portion and making it to emit from a first major surface, with the first light guide including a plurality of hologram optical elements arranged at a specific pitch, so that the hologram optical elements diffract the laser beams incident on the first light guide, according to wavelengths of the laser beams, thereby performing color separation of the laser beams. In this case, it may be so constituted that a plurality of rows extending in a direction vertical to a propagation direction of the laser beams in the first light guide are constituted by the hologram optical elements, and a diffraction efficiency of the rows of the hologram optical elements are respectively differentiated so as to gradually be changed for each row at a specific ratio, along the propagation direction of the laser beams in the first light guide.

In addition, it may be so constituted that the first light guide of the surface illuminator of the present invention includes a plurality of sub-light guides of the same number at least as the number of the kinds of the wavelengths included in the laser beams having different wavelengths from one another, and the plurality of sub-light guides include a plurality of semi-transmissive mirrors arranged at a specific pitch, so that only the laser beams each having same wavelength are propagated through a sub-light guide of the plurality of sub-light guides, and the laser beams incident on the first light guide are partially reflected by the semi-transmissive mirrors, which are then emitted from the first major surface of the first light guide. In this case, it may be so constituted that the semi-transmissive mirrors constitute a plurality of rows extending in a direction vertical to the propagation direction of the laser beams in the first light guide, and the reflectances of the rows of the semi-transmissive mirrors are gradually changed for each row step by step, along the propagation direction of the laser beams in the first light guide.

Further, in the above-described structure, an optical element may be used, for making the laser beams to be almost in parallel and making the laser beams to be incident on the first light guide. By almost parallelizing the laser beams, efficient color separation becomes possible.

The present invention provides a liquid crystal display having a liquid crystal display panel and a backlight illuminator for illuminating the liquid crystal display panel from the backside, the backlight illuminator having a laser light source for emitting a laser beam, and a first plate-shaped light guide for making the laser beams to be incident from an end face portion and making the incident laser beams to emit from a first major surface, wherein the first major surface of the first light guide of the backlight illuminator is disposed in close contact with the liquid crystal display panel, so that the liquid crystal display panel is illuminated by the laser beam emitted from the first major surface. The liquid crystal display panel is provided with pixels including a plurality of sub-pixels for displaying different colors from one another for each pixel to form a color image, and the first light guide includes a launching element for emitting the laser beams corresponding to the color displayed by the sub-pixels from the first major surface. In this case, as a structure of the launching element, the first light guide further includes a plurality of hologram optical elements arranged at a pitch corresponding to the rows of the pixels included in the liquid crystal display panel, with the pixels of the liquid crystal display panel including a red color pixel part for displaying red color, a green color pixel part for displaying green color, and a blue color pixel part for displaying blue color, wherein the hologram optical elements diffract the laser beams incident on the first light guide according to the wavelength of the laser beam, thereby performing color separation of the laser beams, so that the laser beams having different wavelengths from one another can be made to be incident on the red color pixel part, the green color pixel part, and the blue color pixel part, respectively. Further, it may be so constituted that the hologram optical elements constitute a plurality of rows extending in a direction vertical to a propagation direction of the laser beams in the first light guide, and a diffraction efficiency of the rows of the hologram optical elements is respectively differentiated so as to gradually be changed for each row at a specific ratio, along the propagation direction of the laser beams in the first light guide.

Further, in the above-described structure, it may be so constituted that the first light guide includes a plurality of sub-light guides of the same number at least as the number of the kinds of the wavelengths included in the laser beams having different wavelengths from one another, and the pixel of the liquid crystal display panel include the red color pixel part for displaying red color, the green color pixel part for displaying green color, and the blue color pixel part for displaying blue color, and the plurality of sub-light guides include a plurality of semi-transmissive mirrors arranged at a specific pitch, wherein by the plurality of sub-light guides, only the laser beams each having same wavelength are propagated, and the laser beams incident on the first light guide are partially reflected by the semi-transmissive mirrors and emitted from the first major surface of the first light guide, and the laser beams emitted from the first major surface are made to be incident on the red color pixel part, the green color pixel part, and the blue color pixel part. In this case, it may be so constituted that the semi-transmissive mirrors constitute a plurality of rows extending in a direction vertical to the propagation direction of the laser beams in the first light guide, and the reflectances of the rows of the semi-transmissive mirrors are gradually changed for each row step by step, along the propagation direction of the laser beams in the first light guide.

Further, in the above-described structure, the optical element may be used, whereby the laser beams are made to be almost parallel and are made to be incident on the first light guide. By almost parallelizing the laser beams, the efficient color separation is possible.

Effect of the Invention

According to a surface illuminator and a liquid crystal display of the present invention, a laser beam is deflected and scanned at a specific deflection scanning angle, thus making it possible to have a uniform luminance over a large area and also reduce a speckle noise. Further, since a laser light source has excellent color purity, the liquid crystal display with excellent reproduction property and high image quality can be realized. Further, since an emission efficiency of a laser is high, it is possible to exhibit a large advantageous effect that low power consumption is possible as a whole and further higher image quality and low power consumption can be realized.

In addition, according to the surface illuminator and the liquid crystal display of the present invention whereby a large display screen is realized, in-surface uniform luminance can be maintained even when a light source is deteriorated, and a color separation mechanism is provided for emitting each light to each region corresponding to the pixel of each color of the liquid crystal display. Therefore, saving of power consumption can be achieved.

DETAILED DESCRIPTION OF THE INVENTION

The present invention provides a surface illuminator using a laser light source as a light source, having a uniform luminance on a display surface of a large area, having a wide color reproduction range, and capable of suppressing a speckle noise, and provides a liquid crystal display using the surface illuminator.

In the surface illuminator of the present invention, the laser light source having an extremely large luminance is used as the light source. Therefore, the laser light source includes a significantly small number of light sources.

Therefore, even when the laser light source is deteriorated with lapse of time, a uniform luminance can be maintained in a surface of the display.

In addition, it is possible to solve a problem such as a speckle noise that occurs when the laser beams are used as the light source, by giving a sufficient phase difference (variation of optical path) to the laser beams by at least one of the actions of a beam scan section and a first light guide as will be described later.

Preferred embodiments of the present invention will be described hereinafter, with reference to the drawings. Note that the same symbols are assigned to the same element, and description thereof is not provided in some cases. Also, Figure illustrates a surface illuminator with expanded scale so as to be easily understood, wherein dimensions and the like of the liquid crystal display panel and the surface illuminator are not necessarily correctly displayed.

First Embodiment

Figure 1A:
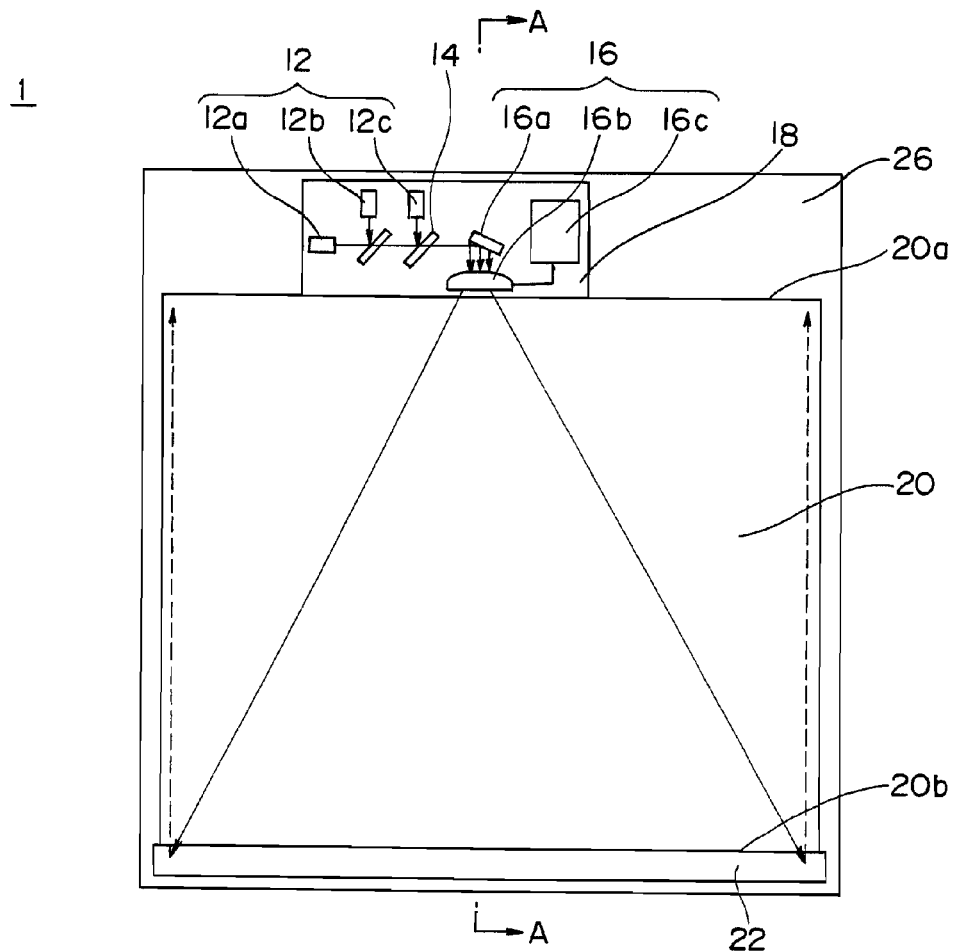
FIG. 1A is a plan view illustrating a surface illuminator according to a first embodiment of the present invention.
Figure 1B:
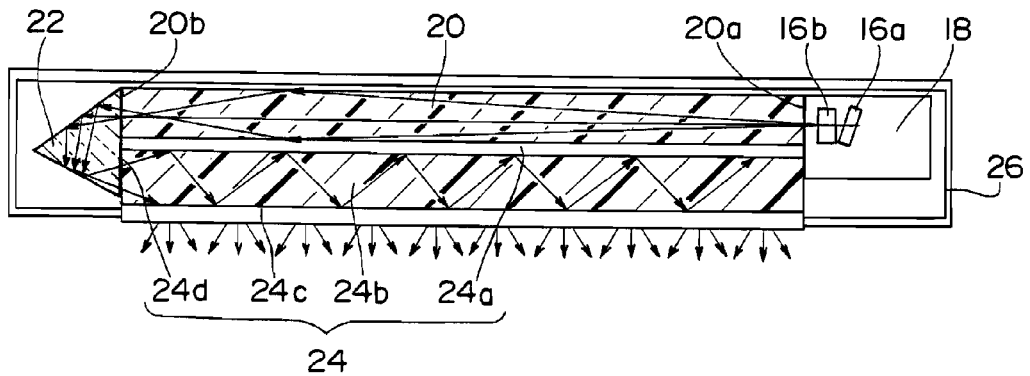
FIG. 1B is a schematic sectional view along the line A-A of FIG. 1A.

FIG. 1A and FIG. 1B are diagrams illustrating a surface illuminator according to a first embodiment of the present invention. FIG. 1A is a plan view illustrating an outline of the structure, and FIG. 1B is a schematic sectional view along the line A-A of FIG. 1A.

As illustrated in FIG. 1A, the surface illuminator 1 of the first embodiment has a structure as described below. A surface illuminator 1 has laser light sources 12a, 12b, and 12c. A laser light source 12 has three light sources such as a red light (R-light) source 12a, a green light (G-light) source 12b, and a blue light (B-light) source 12c that emit light of three primary colors.

In addition, with reference to FIG. 1B, the surface illuminator 1 includes a first plate-shaped light guide (first light guide) 24 whereby the laser beam emitted from the laser light sources 12a to 12c is caused to be incident from end face portion 24d, and are caused to emit from a major surface. With reference again to FIG. 1A, the surface illuminator 1 includes a beam scan section 16 in a direction parallel to the first light guide plate 24, whereby the laser beam is deflected and scanned by reciprocal movement which is set previously. The beam scan section 16 can include a cylindrical lens 16b having a prescribed NA.

Further, with reference to FIG. 1A, the surface illuminator 1 includes an optical path conversion section 22 for converting an optical path of the laser beam emitted from the beam scan section 16, and a second light guide plate (second light guide) 20 for guiding the laser beam which is deflected and scanned by the beam scan section 16 to the optical path conversion section 22. It is desirable to dispose the second light guide plate 20 so as to laminate on another major surface of the first light guide plate 24. Also it is desirable to dispose the beam scan section 16 in the vicinity of the side of an end face portion 20a of the second light guide plate 20, and dispose the optical path conversion section 22 in another end face portion 20b opposed to the end face portion 20a.

In addition, a diffusion plate 24c is disposed on a major surface of the first light guide plate 24, as a deflection sheet for deflecting an advancing direction of the laser beam. Further, in the first embodiment, a reflection layer 24a, on which, for example, a micro-dot pattern (irregularity shape) is formed, is disposed on another major surface of the first light guide plate 24, for uniformly diffusing and reflecting the incident laser beam so as to be incident on the major surface.

Further, preferably a prism pattern and a light scattering surface are provided on another major surface of the light guide plate. Whereby, a uniform emission from the major surface becomes possible, and in conjunction with a deflection surface of the major surface, a diffusion pattern is dispersed at random and the speckle noise is further reduced.

As the optical path conversion section 22, for example, a reflector and a triangular prism or the like can be used. Further, in accordance with an incident angle scanned by the beam scan section 16, the angle may be adjusted so that the laser beam can be caused to be incident on the first light guide plate 24 without leakage, and further uniform planar illumination light can be obtained. In addition, the optical path conversion section 22 may have a micro-irregular shape on its inside surface so that the scattered laser beam may be caused to be incident on the light guide plate. By applying such a processing to the inside surface, the laser beam incident on the first light guide plate 24 can be almost parallelized or the uniform illumination can be possible.

In the first embodiment, in order to cause the laser beam incident on the first light guide plate 24 to be almost parallel, a cylindrical Fresnel lens surface having the same NA as the NA of the cylindrical lens of the beam scan section 16 is disposed in the optical path conversion section 22. Also, in order to obtain uniformity and reduce the speckle noise, a light scattering surface having a minute irregular pattern is provided on another surface of the optical path conversion section 22.

The laser beams from the laser light source 12 including the R-light source 12a, G-light source 12b, and B-light source 12c are collimated, then multiplexed by, for example, a dichroic mirror 14, and thereafter are caused to be incident on the beam scan section 16. Note that, in the first embodiment, the beam scan section 16 further includes an optical element (not shown) for shaping the laser beam emitted from the laser light source 12 into a flat beam, and hence the laser beam incident on the cylindrical lens 16b is formed into a flat beam.

In addition, the beam scan section 16 has the reflection mirror 16a, the cylindrical lens 16b and a reciprocally moving mechanism 16c for reciprocally moving the cylindrical lens 16b in a direction parallel to end face portion 24d of the first light guide plate 24. By using this reciprocally moving mechanism 16c, the cylindrical lens 16b is reciprocally moved and the laser beam can be caused to be incident on the first light guide plate 24 with a uniform light intensity. Further, by this reciprocal movement, the speckle noise can be suppressed. Such a reciprocal movement is a simple action and therefore can be easily performed, when a film-like piezo electric element is used. Also, a general structure is also possible, such as that using a voice coil.

Note that, in the first embodiment, the laser light source 12, the dichroic mirror 14, and the beam scan section 16 are collectively housed in the housing 18. However, the housing 18 may not be particularly provided. In addition, the laser light source 12, the first light guide plate 24 and the like are housed in a casing 26. However, FIG. 1A shows the casing 26 and the housing 18 with the surfaces thereof cut out respectively.

Thus, the laser beam is incident on the optical path conversion section 22 over its entire body in a length direction, with a uniform light intensity. Moreover, by diffusing the laser beam by the cylindrical lens 16b and reciprocally moving the cylindrical lens 16b, the speckle noise can be suppressed. As a result, the surface illuminator 1 having a uniform light intensity in the major surface and capable of suppressing the speckle noise can be obtained.

Note that the first light guide plate 24 and the second light guide plate 20 may be made of a transparent resin material having excellent optical characteristics and moldability. Particularly, an acrylic resin or a polyolefin-based resin having a small double refraction is preferably used, which may be formed in a thin film-like shape or may be hollow (air). Further, the diffusion plate 24c provided on the major surface side of the first light guide plate 24 is provided to emit a further uniform planar illumination light from the side of the major surface of the first light guide plate 24. In addition, a prism sheet or a lens sheet may be provided on the surface of the diffusion plate 24c. Moreover, further another diffusion plate may be provided on the surface of such prism sheet or lens sheet.

By using such diffusion plate and lens sheet, lighting of a uniform brightness is made possible and the deflected and scanned laser beams can be emitted from a lighting side of the surface illuminator 1, as beams having angle distribution and having phase distribution with respect to each scanning position (angle).

Figure 2:
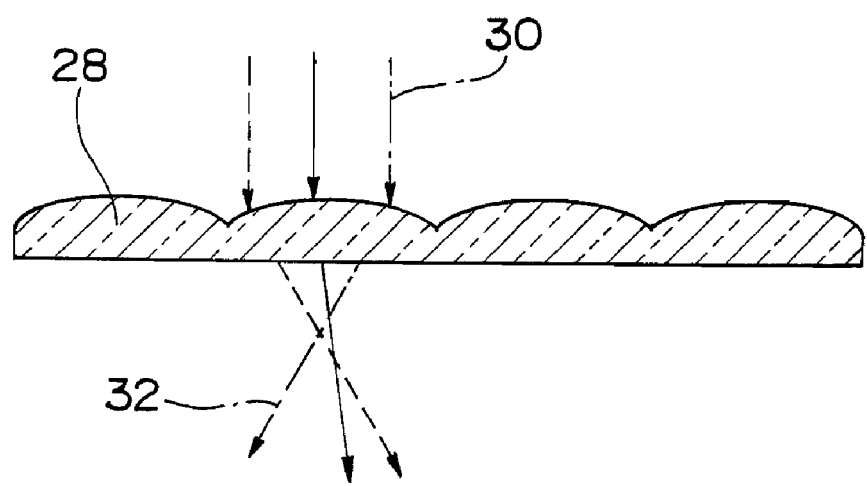
FIG. 2 is a diagram illustrating a change of an angle of a laser beam when a lens sheet is used in the surface illuminator according to the first embodiment of the present invention.

An angle variation of the laser beams when the lens sheet 28 is provided on the surface of the diffusion plate 24c will be described hereinafter. FIG. 2 is a diagram illustrating the aforementioned matter. As illustrated in FIG. 2, incident laser beams 30 are incident on, for example, a lens sheet 28 while being scanned. Emission laser beams 32 have a angle (phase) distribution being different from that of the incident laser beam 30, with respect to a scanning position (angle). Accordingly, not only the uniformity of the luminance of illumination, but also suppression of the speckle noise is possible.

Note that materials of the diffusion plate 24c and the lens sheet 28 may also be transparent resin materials having excellent optical characteristics and moldability. Particularly, the acrylic resin or polyolefin resin having a small double refraction is preferable.

Note that it is preferable to directly provide these diffusion plate 24c and lens sheet 28 on the surface of the first light guide plate 24. Thus, emission of almost parallelized laser beams from the major surface of the first light guide plate 24 is urged, thus making it possible to directly emit the laser beams at an angle almost vertical to the major surface.

Note that, in addition to the diffusion plate 24c or without providing the diffusion plate 24c, a diffusion area for diffusing the laser beams may be formed by dispersing resin beads having a refractive index different from the refractive index of a plastic resin material, into the plastic resin material contained in the first light guide plate 24. The laser beams are partially transmitted or partially diffused through this diffusion area. Therefore, further uniform planar illumination light can be obtained from the major surface of the first light guide plate 24.

With this structure, it is possible to realize the surface illuminator preventing a generation of the speckle noise which is a problem in using the laser light source, causing no unevenness in intensity of interference light, and having a uniform light intensity distribution in the surface.

Figure 3A:
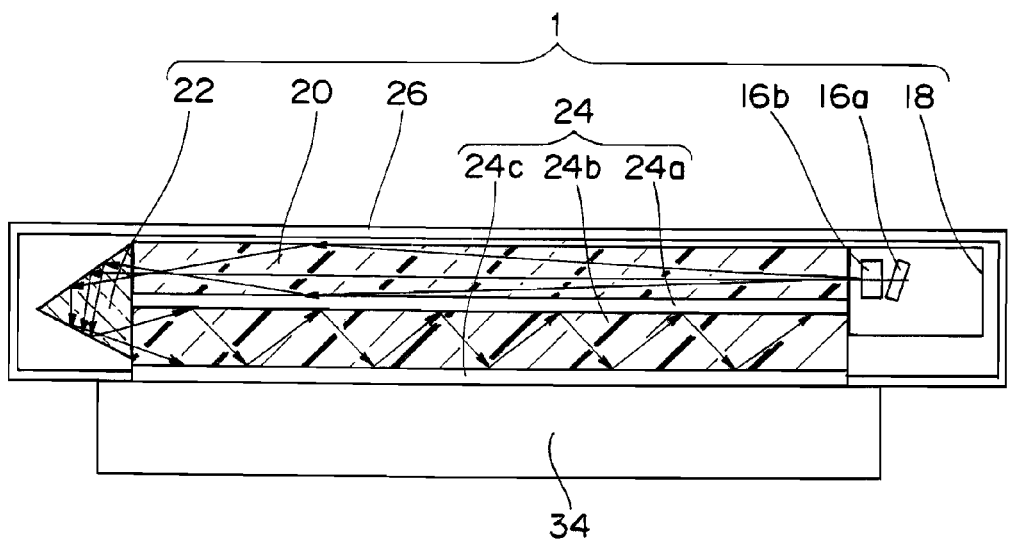
FIG. 3A is a schematic sectional view illustrating a structure of the liquid crystal display using the surface illuminator according to the first embodiment of the present invention as a backlight illuminator.
Figure 3B:
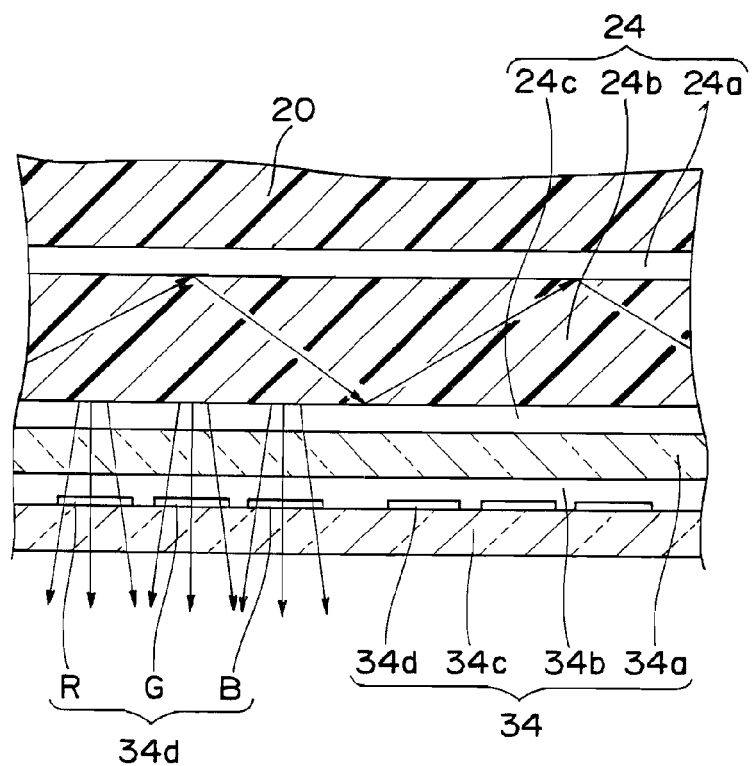
FIG. 3B is a partial expanded schematic sectional view of FIG. 3A.

FIG. 3A and FIG. 3B are diagrams illustrating a structure of the liquid crystal display in which the surface illuminator 1 according to the first embodiment is used as the backlight illuminator. FIG. 3A is a schematic sectional view of the liquid crystal display, and FIG. 3B is a expanded partial schematic sectional view of FIG. 3A.

The liquid crystal display according to the first embodiment includes a liquid crystal display panel 34 and a backlight illuminator for lighting the liquid crystal display panel 34 from backside, with this backlight illuminator including the aforementioned surface illuminator 1. Major surfaces of the first light guide plate 24 of the surface illuminator 1 and the liquid crystal display panel 34 may be disposed closely in contact with each other. In the first embodiment, the diffusion plate 24c is disposed between the major surface of the first light guide plate 24 and the liquid crystal display panel 34.

The liquid crystal display panel 34 has a transmissive type or a semi-transmissive type structure, such as a TFT active matrix type liquid crystal display panel. As illustrated in FIG. 3B, its display area has a plurality of pixels 34d including a red color pixel part (R sub-pixel), a green pixel part (G sub-pixel), and a blue pixel part (B sub-pixel) provided therein, and is driven by the TFT. Then, a liquid crystal 34b is provided between two grass substrates 34a and 34c, and the TFT (not shown) for driving this liquid crystal 34b is formed in one of the glass substrates 34a and 34c. A conventionally used liquid crystal display panel 34 can be used, and therefore detailed description thereof is not provided.

In the liquid crystal display of the first embodiment, the surface illuminator 1 according to the present invention is used as the backlight illuminator. Therefore, even when having a display screen area, the liquid crystal display has a uniform luminance, and further the speckle noise can be suppressed. In addition, it is possible to obtain emission wavelengths of an R-light source 12a, a G-light source 12b, and a B-light source 12c constituting the laser light source 12, with extremely excellent color purity, thus making it possible to largely expand a color reproduction range of the liquid crystal display. As a result, a display image of high image quality can be obtained, compared to the liquid crystal display in which a system of using a conventional fluorescent tube display and an LED light source is adopted. In addition, the laser light source has an excellent emission efficiency compared to the LED light source, thus making it possible to realize low power consumption.

Note that, in the first embodiment, the structure of the beam scan section 16 using the cylindrical lens 16b has been described. However, the present invention is not limited thereto. For example, instead of the cylindrical lens 16b, a lenticular lens may be used.

Note that, in the first embodiment, the optical element (not shown) is disposed nearer to an incident side than the beam scan section 16, whereby the laser beams are formed into flat beams so as to spread in a direction parallel to the first light guide plate 24. However, the optical element may be disposed on a light emission side. In either case, uniformity of the intensity distribution of the laser beams can be assisted.

In the present invention, the laser beams with high luminance are scanned, and a uniform surface illuminator of a large screen is realized. Therefore, when only the intensity of the scanned laser beams is managed, it is possible to respond to a variation in luminance of the lighting device with the lapse of time. In addition, even when the beams from a plurality of laser light sources are scanned, by managing only the intensity of the laser beams obtained by multiplexing the beams from a plurality of laser light sources, the luminance can be excellently maintained. Therefore, problems such as an interindividual difference in the individual light source element, being a problem when using a plurality of light sources, and the variation of the luminance with lapse of time can be solved by the surface illuminator using the laser beams according to the present invention.

Second Embodiment

Figure 4A:
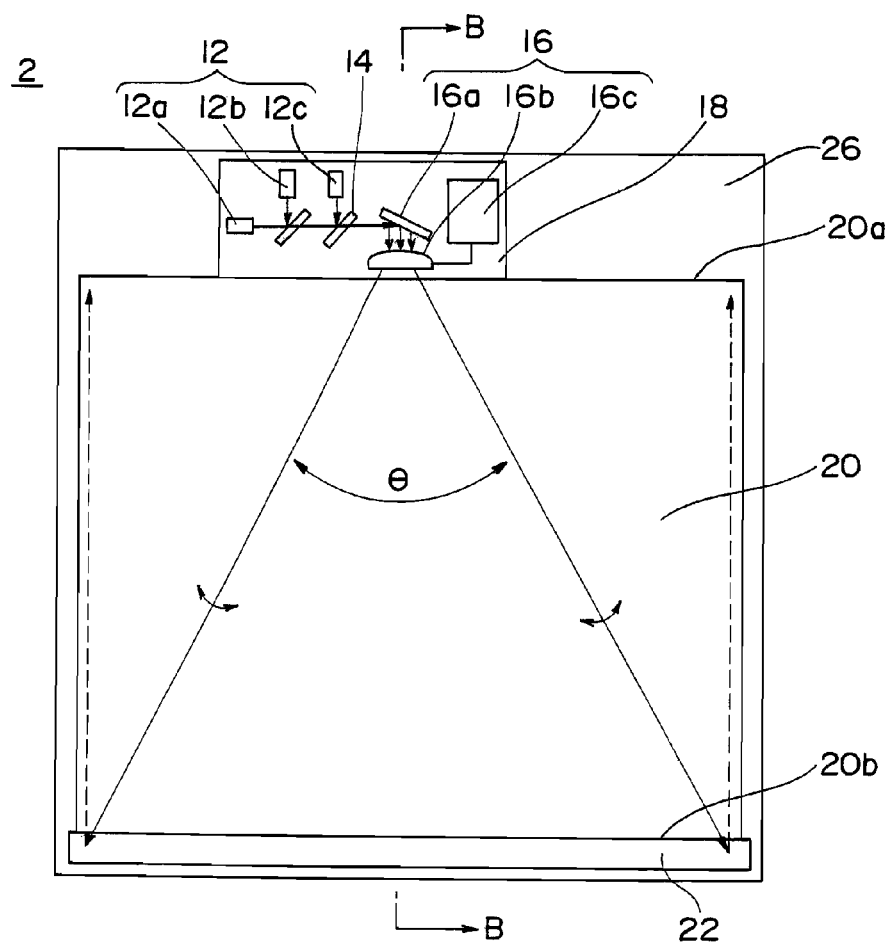
FIG. 4A is a schematic plan view illustrating a structure of a surface illuminator according to a second embodiment of the present invention.
Figure 4B:
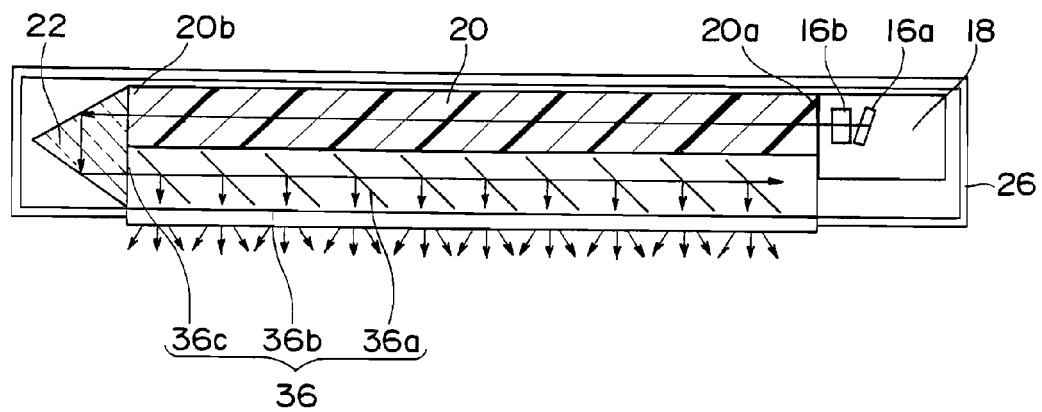
FIG. 4B is a schematic sectional view along the line B-B of FIG. 4A.

FIG. 4A and FIG. 4B are diagrams illustrating a surface illuminator 2 according to a second embodiment of the present invention. FIG. 4A is a schematic plan view illustrating the structure, and FIG. 4B is a schematic sectional view along the line B-B of FIG. 4A.

The surface illuminator 2 of the second embodiment is different from the surface illuminator 1 of the first embodiment in the point that a structure of a first light guide plate 36 is different from the structure of the first light guide plate 24. Namely, in the second embodiment, a plurality of semi-transmissive mirrors 36a are arranged inside the first light guide plate 36 at a constant pitch. Then, the laser beam incident on the first light guide plate 36 are partially reflected by the semi-transmissive mirrors 36a, in a direction of a major surface (direction of the diffusion plate 36b) of the first light guide plate 36. Note that, in the semi-transmissive mirrors 36a, their reflectances are differentiated at a specific ratio, from an incident surface of the first light guide plate 36, namely from an end face portion 36c side to a propagation direction of the laser beam. Accordingly, the luminance of the laser beams reflected by each semi-transmissive mirror 36a and emitted to the major surface can be made uniform.

The diffusion plate 36b is disposed on the side of the major surface of the first light guide plate 36. The angle of the laser beam is changed by this diffusion plate 36b, thus making it possible to suppress the speckle noise. Other structure may be the same as that of the surface illuminator 1 of the first embodiment, and the structure for utilization as the liquid crystal display may also be the same as the structure as illustrated in FIG. 3A and FIG. 3B, and therefore description thereof is omitted.

Third Embodiment

Figure 5:
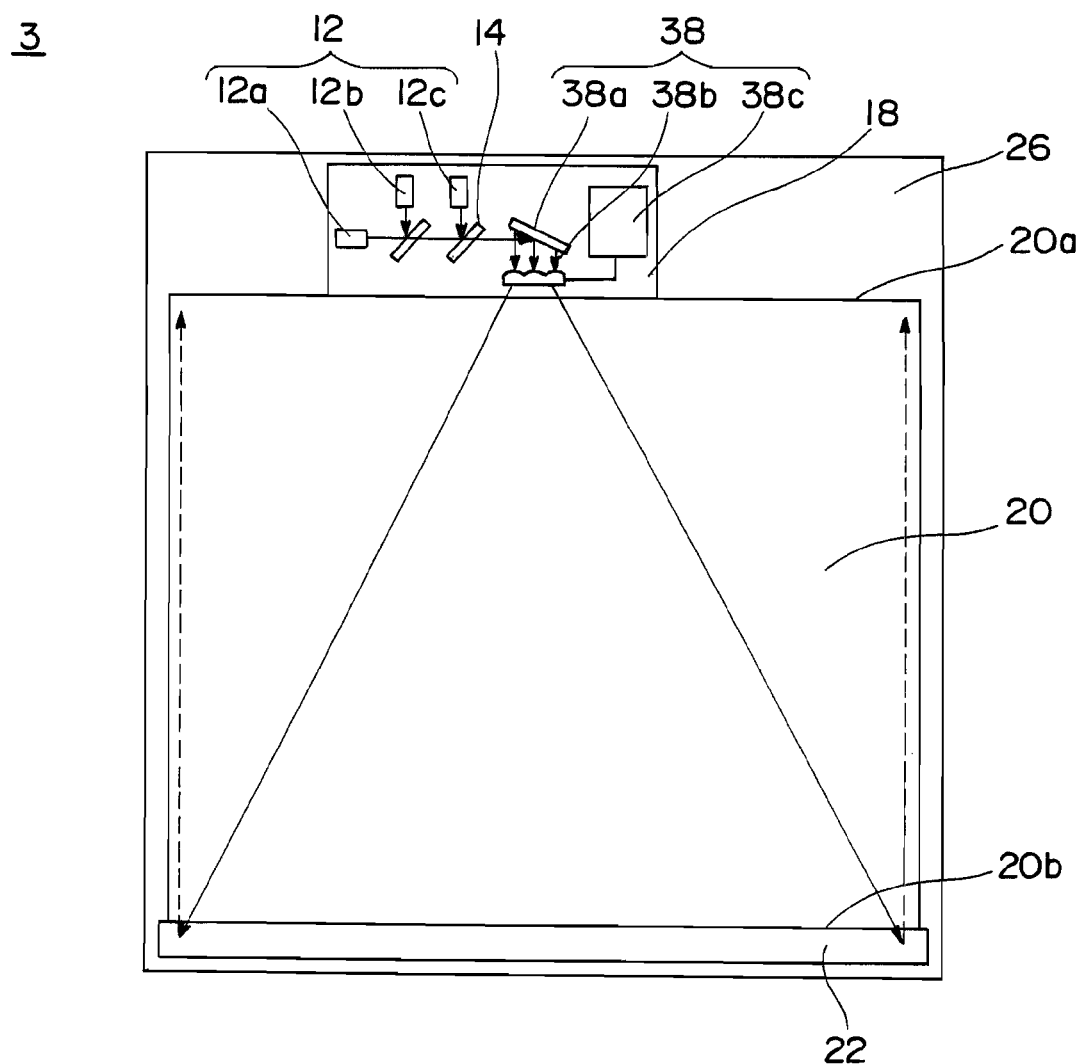
FIG. 5 is a schematic plan view illustrating a structure of a surface illuminator according to a third embodiment of the present invention.

FIG. 5 is a schematic plan view illustrating a structure of a surface illuminator 3 according to a third embodiment of the present invention. Also in this illustration for the surface illuminator 3, each surface of the casing 26 and the housing 18 is cut out, thereby making it easy to understand an internal structure.

The surface illuminator 3 of the third embodiment has a beam scan section 38 having a different structure from that of the beam scan section 16 of the first embodiment. In fact, the cylindrical lens 16b is used in the beam scan section 16 of the surface illuminator 1 of the first embodiment. However, in the surface illuminator 3 of the third embodiment, instead of the cylindrical lens 16b, a lenticular lens 38b is used. The laser beam is reflected by the reflection mirrors 38a of the beam scan section 38, and then caused to be incident on the lenticular lens 38b. The laser beam incident on the lenticular lens 38b is spread one-dimensionally and is caused to be incident on the optical path conversion section 22. In this case, by reciprocally moving the lenticular lens 38b by a reciprocally moving mechanism 38c in a constant distance, the intensity distribution of the laser beam incident on the optical path conversion section 22 can be made uniform, and the speckle noise can also be suppressed.

In a case of the third embodiment, it is desirable to form the laser beam into flat beam before being incident on the lenticular lens 38b. Therefore, it is desirable to insert the optical element (not shown) for forming the laser beam into flat beam, between the reflection mirror 38a and the lenticular lens 38b. Alternately, the optical element (not shown) for forming the laser beam into flat beam may be inserted between the dichroic mirror 14 and the reflection mirror 38a. Thus, in the third embodiment, by using the lenticular lens 38b, the laser beam emitted from the lenticular lens 38b can be spread in a uniform state. Note that as the reciprocally moving mechanism 38c, for example, a piezoelectric element can be used.

Other structure may be the same as that of the surface illuminator 1 of the first embodiment, and the structure for utilization as the liquid crystal display may also be the same as the structure as illustrated in FIG. 3A and FIG. 3B, and description thereof is omitted. Note that the structure like the surface illuminator 2 of the second embodiment can also be adopted.

Fourth Embodiment

Figure 6:
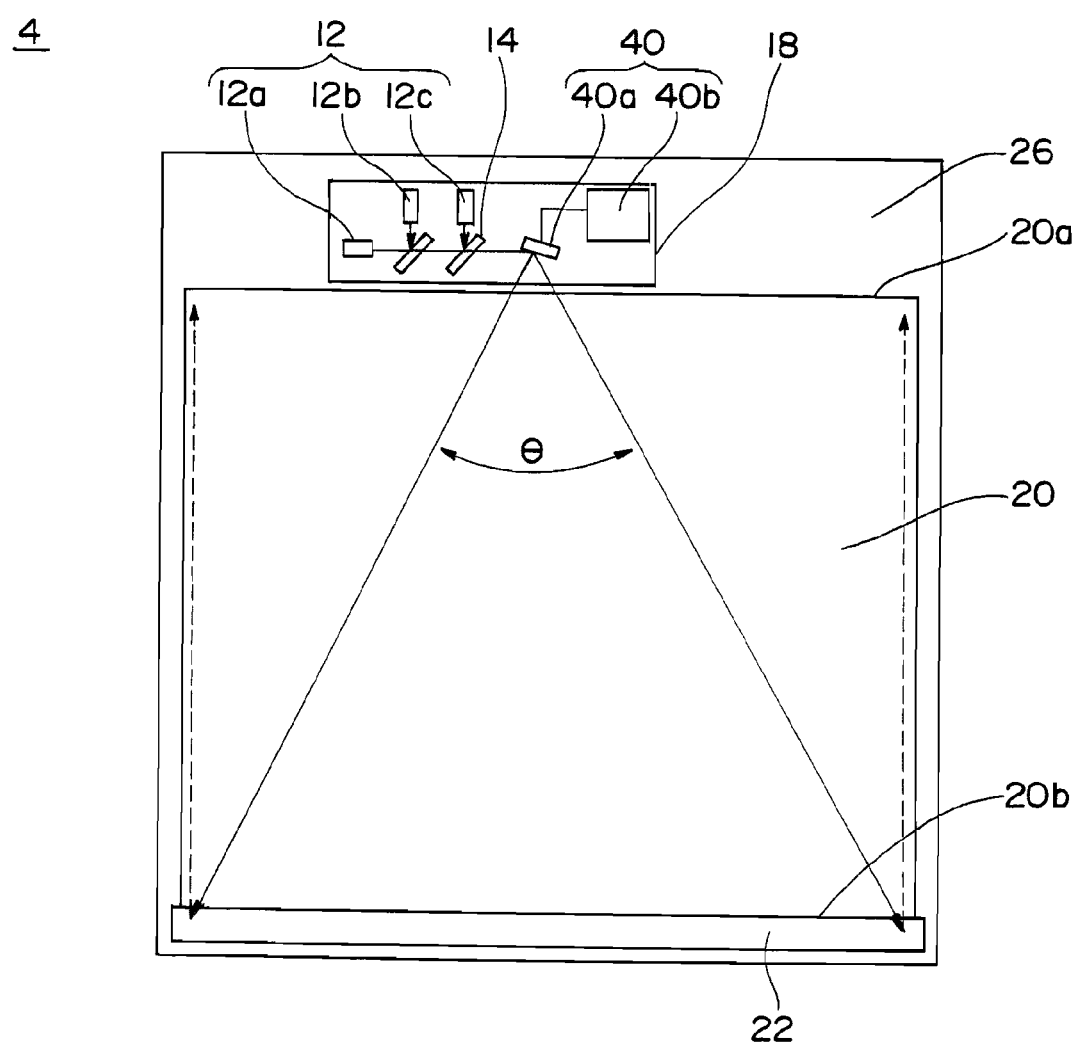
FIG. 6 is a schematic plan view illustrating a structure of a surface illuminator according to a fourth embodiment of the present invention.

FIG. 6 is a schematic plan view illustrating a structure of a surface illuminator 4 according to a fourth embodiment of the present invention. Also in this illustration for the surface illuminator 4, each surface of the casing 26 and the housing 18 is cut out, thus making it easy to understand the internal structure.

In the surface illuminator 4 of the fourth embodiment, the structure of a beam scan section 40 is different from that of the beam scan section 16 of the surface illuminator of the first embodiment. Namely, in the surface illuminator 4 of the fourth embodiment, the beam scan section 40 has a structure of including a reflection mirror 40a and an angle adjusting mechanism 40b for changing the angle of the reflection mirror 40a. Then, by using the angle adjusting mechanism 40b, thereby changing the angle of the reflection mirror 40a, the laser beam is deflected and scanned in a deflection scanning angle. Thus, as illustrated in FIG. 6, the laser beam is deflected and scanned by the reflection mirror 40a in a deflection scanning angle θ, so that an entire surface of the optical path conversion section 22 in a length direction is irradiated with the laser beam. As illustrated in FIG. 6, the deflection scanning angle θ is an angle formed by limits of the laser beams deflected and propagated by the reflection mirror 40a at the reflection mirror 40a.

Thus, the laser beam can be incident on over an entire body of the optical path conversion section 22 in the length direction, and therefore the laser beam can be caused to be incident uniformly to the entire surface of the first light guide plate 24 from the optical path conversion section 22. Simultaneously, the speckle noise can also be suppressed.

Other structure may be the same as that of the surface illuminator 1 of the first embodiment, and description thereof is omitted. Note that, in a case of the surface illuminator 4 of the fourth embodiment, setting of the angle at each position in the optical path conversion section 22 can be easily designed, whereby the laser beam in the first light guide plate 24 are almost parallelized.

In the optical path conversion section 22, a cylindrical Fresnel lens surface, with the reflection mirror 40a set as a focal point, is formed, thus almost parallelizing the laser beam incident on the first light guide plate 24. In addition, in order to cause the intensity of the laser beam to be uniform and to remove the speckle noise, it is desirable to dispose, for example, a light scattering surface on the surface of the optical path conversion section 22 similarly to the first embodiment, before the laser beam is made incident on the first light guide plate 24.

In a case of the surface illuminator 4, a beam scan section 40 can be constituted only by the reflection mirror 40a and the angle adjusting mechanism 40b. As described above, by using a silicon substrate, the reflection mirror 40a can be formed by a micro-electro-mechanical system (MEMS) technique. Similarly by using the MEMS technique, for example, an angle adjusting mechanism 40b can also be formed integrally with the reflection mirror 40a, for adjusting the deflection scanning angle by the piezoelectric element and generating the oscillation of the laser beam. With this structure, the size of the beam scan section 40 can be significantly miniaturized.

In addition, a polygon mirror and a rotary adjustment mechanism can also be used as the reflection mirror 40a and the angle adjusting mechanism 40b.

The structure of the liquid crystal display using the surface illuminator 4 as the backlight illuminator may be the same as that of the liquid crystal display illustrated in FIG. 3A and FIG. 3B, and description thereof is omitted.

In the surface illuminator 4, a vertical angle oscillation mechanism can further be added, in which the angle adjusting mechanism 40b also causes the emission angle of the laser beam to oscillate in the direction vertical to the direction of the deflection scanning through the change of the angle of the reflection mirror 40a so that the angle varies according to the overlapped variation of the angle of the reflection mirror 40a. By slightly oscillating in the vertical direction the angle of the laser beam reflected on the reflection mirror 40a by the vertical angle oscillation mechanism, a pattern of an angle variation is overlapped in a direction vertical to the direction of the angle variation. Thus, the speckle noise can be further suppressed. In addition, the vertical angle oscillation mechanism may also be added to the surface illuminator 1 of FIG. 1.

Figure 7A:
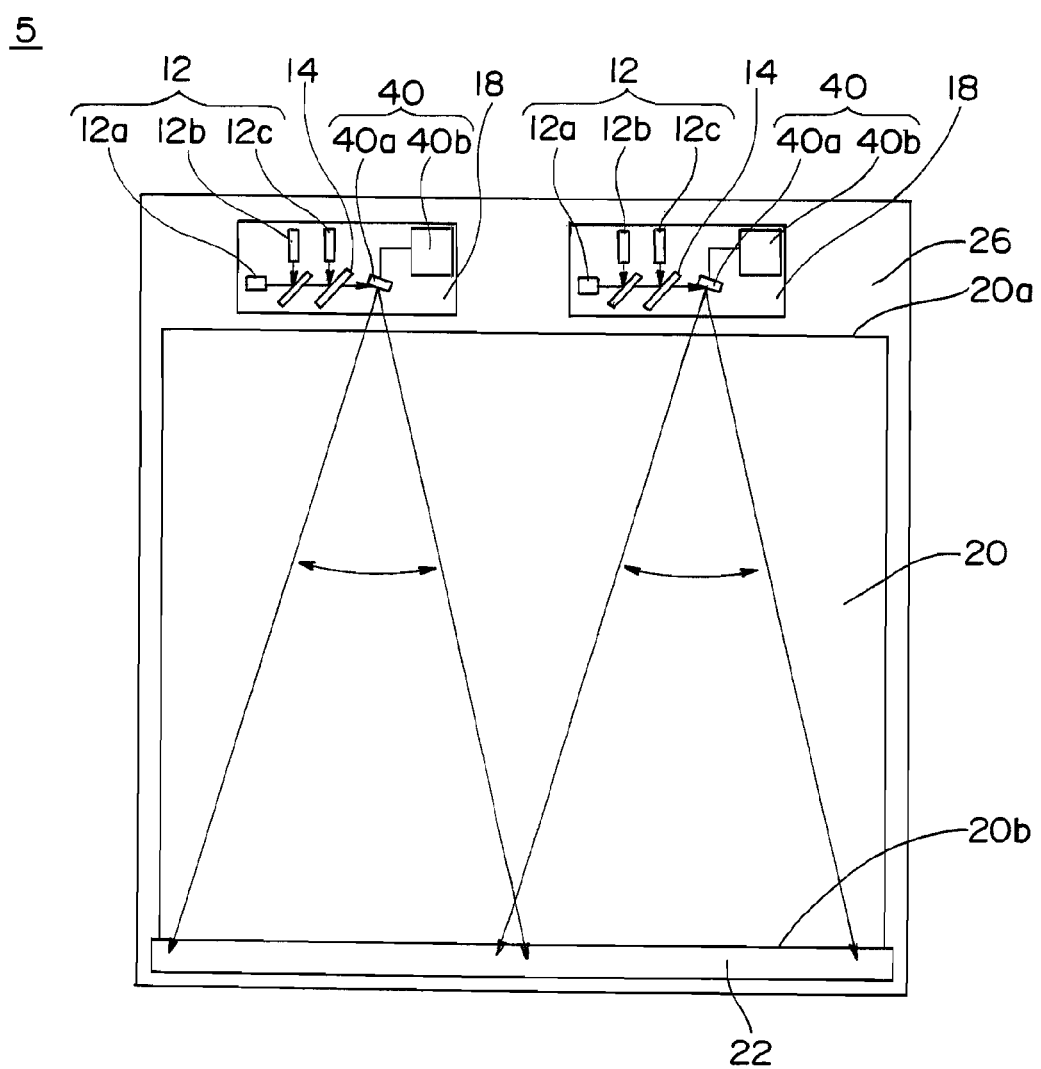
FIG. 7A is a schematic plan view illustrating a structure of a surface illuminator of a modification of the fourth embodiment of the present invention.

FIG. 7A is a schematic plan view illustrating a structure of the surface illuminator 5 which is a first modification example of the fourth embodiment. In this modified example also, each surface of the casing 26 and housing 18 is cut out, thus making it easy to understand the internal structure.

The surface illuminator 5 according to the first modified example includes two sets of the laser light source 12 having the R-light source 12a, the G-light source 12b, and the B-light source 12c shown in FIG. 6, the reflection mirror 40a, the angle adjusting mechanism 40b, and the housing 18 for integrally housing them. With this structure, even in a case of the liquid crystal display of a large screen, the surface illuminator 5 having a uniform luminance can be obtained. Other structure may be the same as that of the surface illuminator 4 of the fourth embodiment, and description thereof is omitted.

By providing two sets of the laser light source 12 and the beam scan section 40, a length of the end face of the first light guide plate 24 can be shortened, so that the laser beam is caused to be incident on the end face of the first light guide plate 24 in a state of being expanded. Therefore, it is possible to shorten the distance between the beam scan section 40 and the end face of the first light guide plate 24, which is necessary for expanding the laser beams.

The structure of the liquid crystal display using the surface illuminator 5 of the first modified example as the backlight illuminator may also be the same structure as the liquid crystal display illustrated in FIG. 3A and FIG. 3B, and description thereof is omitted.

In the surface illuminator 5 of the first modified example, there are provided two sets of the laser light source 12, the beam scan section 40, and the housing 18, however three or more sets of them may be provided. In addition, a speed for deflection scanning is not necessarily a constant speed and may be suitably changed to obtain the uniformity of illumination.

Figure 7B:
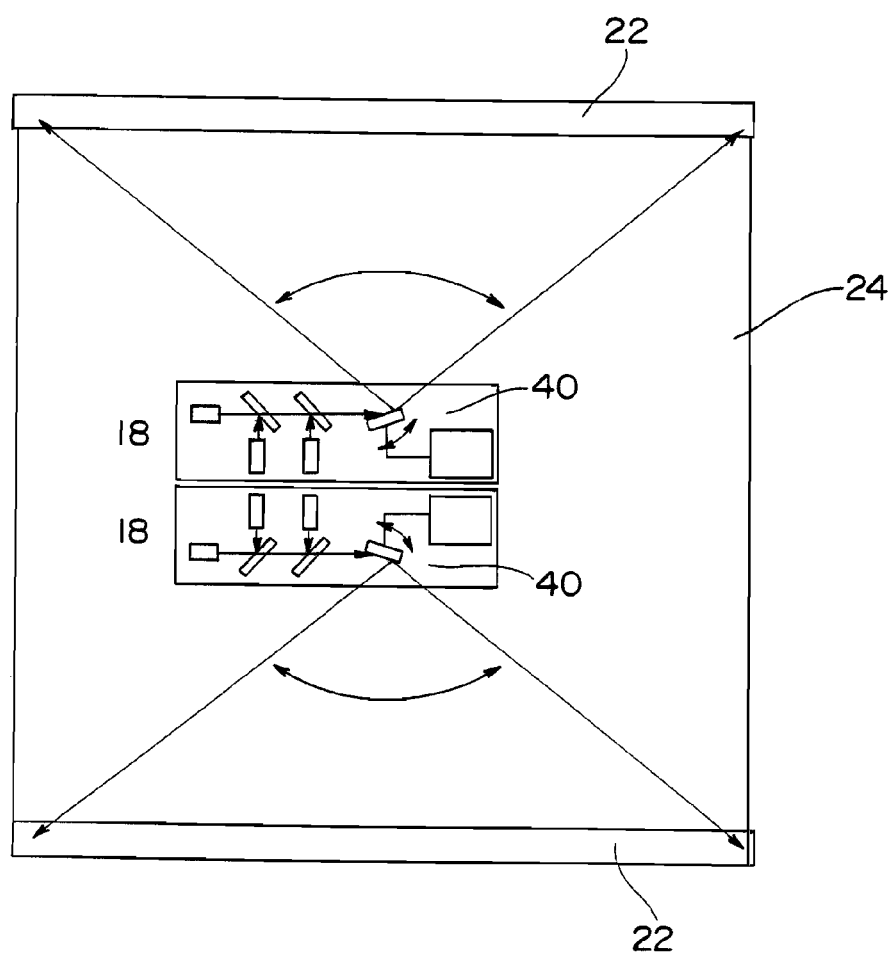
FIG. 7B is a schematic plan view illustrating a structure of a surface illuminator of another modification of the fourth embodiment of the present invention.

FIG. 7B is a schematic plan view illustrating a structure of the surface illuminator 100, being a second modification example of the fourth embodiment. In the second modified example, two sets of the laser light source and the beam scan section, and the housing 18 for housing them are provided, and the laser beams are caused to be incident from two mutually different end face portions of the first light guide plate 24. In order to cause the laser beams to be incident from the two mutually different end faces, the surface illuminator 100 has two optical path conversion sections. With this structure, an irradiation intensity distribution of the laser beams emitted from the major surface of the first light guide plate 24 can be made uniform, compared to a case of having one set of the laser light source and the beam scan section, and this contributes to reducing the speckle noise.

Note that, in this second modified example, two sets of the laser light source of RGB and the beam scan section are used. However, one laser light source of RGB may be used, and the laser beam of this RGB may be distributed to two beam scan sections. Also, four scanning sections may be provided, and the laser beam may be caused to be incident from four end faces of the first light guide plate 24.

Fifth Embodiment

Figure 8:
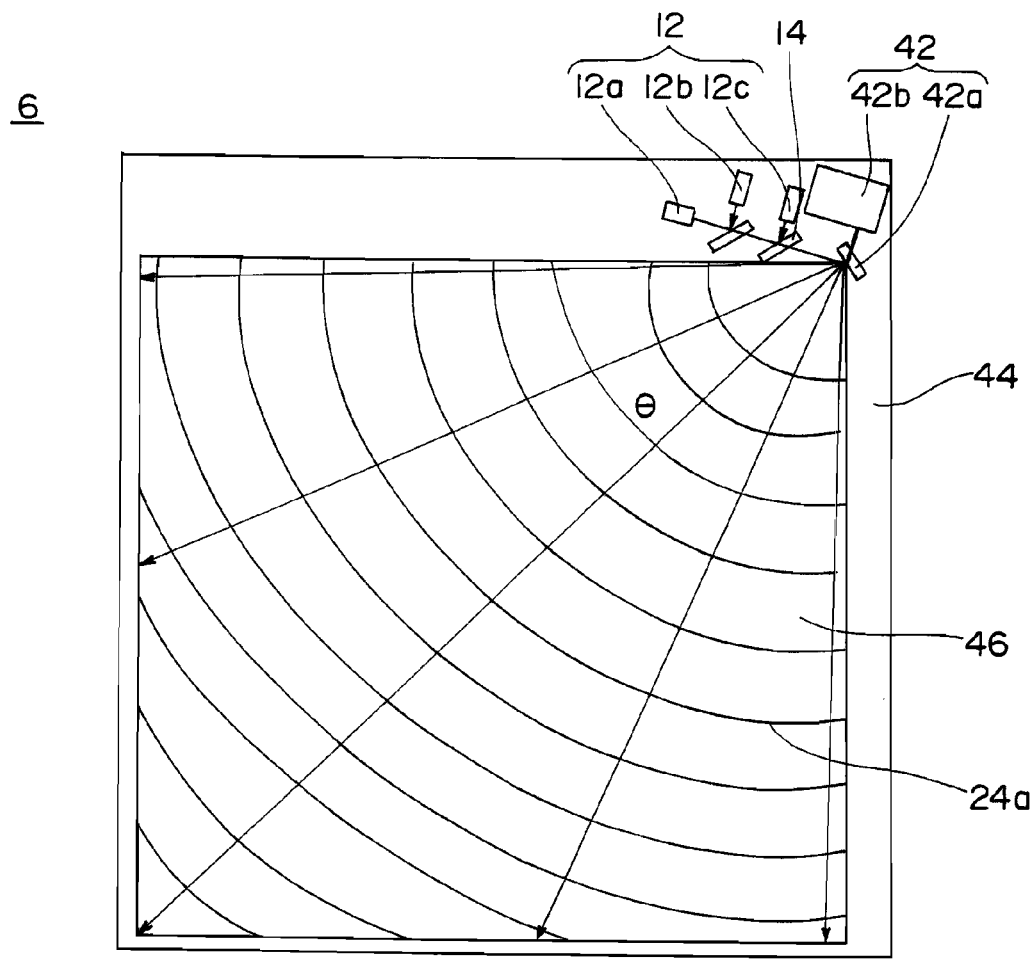
FIG. 8 is a schematic plan view illustrating a structure of a surface illuminator according to a fifth embodiment of the present invention.

FIG. 8 is a schematic plan view illustrating a structure of a surface illuminator 6 of a fifth embodiment. When the surface illuminator 6 is illustrated also, the surface of a casing 44 is cut out, thus making it possible to easily understand the internal structure. Note that the housing for housing the laser light source 12 and a beam scan section 42 are not illustrated. In addition, the beam scan section 42 is constituted by including a reflection mirror 42a and an angle adjusting mechanism 42b.

In the surface illuminator 6 of the fifth embodiment, the reflection mirror 42a of the beam scan section 42 is disposed at a corner part of the first light guide plate 46, to deflect and scan a laser beam at a deflection scanning angle θ. The laser beam is deflected and scanned in a direction parallel to the first light guide plate 46. Further, the first light guide plate 46 has a structure of using the reflection layer 24a on which a minute dot pattern is formed, similarly to the surface illuminator 1 of the first embodiment. It is desirable to dispose the reflection layers 24a, for example, on concentric circles, with the reflection mirror 42a as a center. In the surface illuminator 6 of the fifth embodiment, the speed (for example, angular speed) for deflecting and scanning the reflection mirror 42a is desirably not set to be constant. The laser beam is desirably scanned, so that the angular speed of deflection scanning may become minimum in a direction of a longer optical path of the laser beam in the first light guide plate 46, namely, in a direction of a diagonal line in a case of the surface illuminator 6 illustrated in FIG. 8.

With this structure, the laser beam emitted from the laser light source 12 is deflected and scanned by the reflection mirror 42a, which is then incident on the first light guide plate 46, and is reflected by the reflection layer 24a in the first light guide plate 46, and is emitted from a major surface of the first light guide plate 46. A luminance distribution of laser beams emitted from the major surface of the first light guide plate 46 can be made uniform by changing the angular speed of the deflection scanning of the reflection mirror 42a by a reflecting direction of the laser beams, and by an arrangement pattern of the reflection layer 24a. Thus, there is no necessity for using the optical path conversion section, the second light guide plate or the like. Accordingly, the structure of the surface illuminator 6 can be simplified, thus making it possible to realize a low cost.

The structure of the liquid crystal display using the surface illuminator 6 of the fifth embodiment as the backlight illuminator may be the same as that of the liquid crystal display illustrated in FIG. 3A and FIG. 3B, and description thereof is omitted.

Sixth Embodiment

Figure 9:
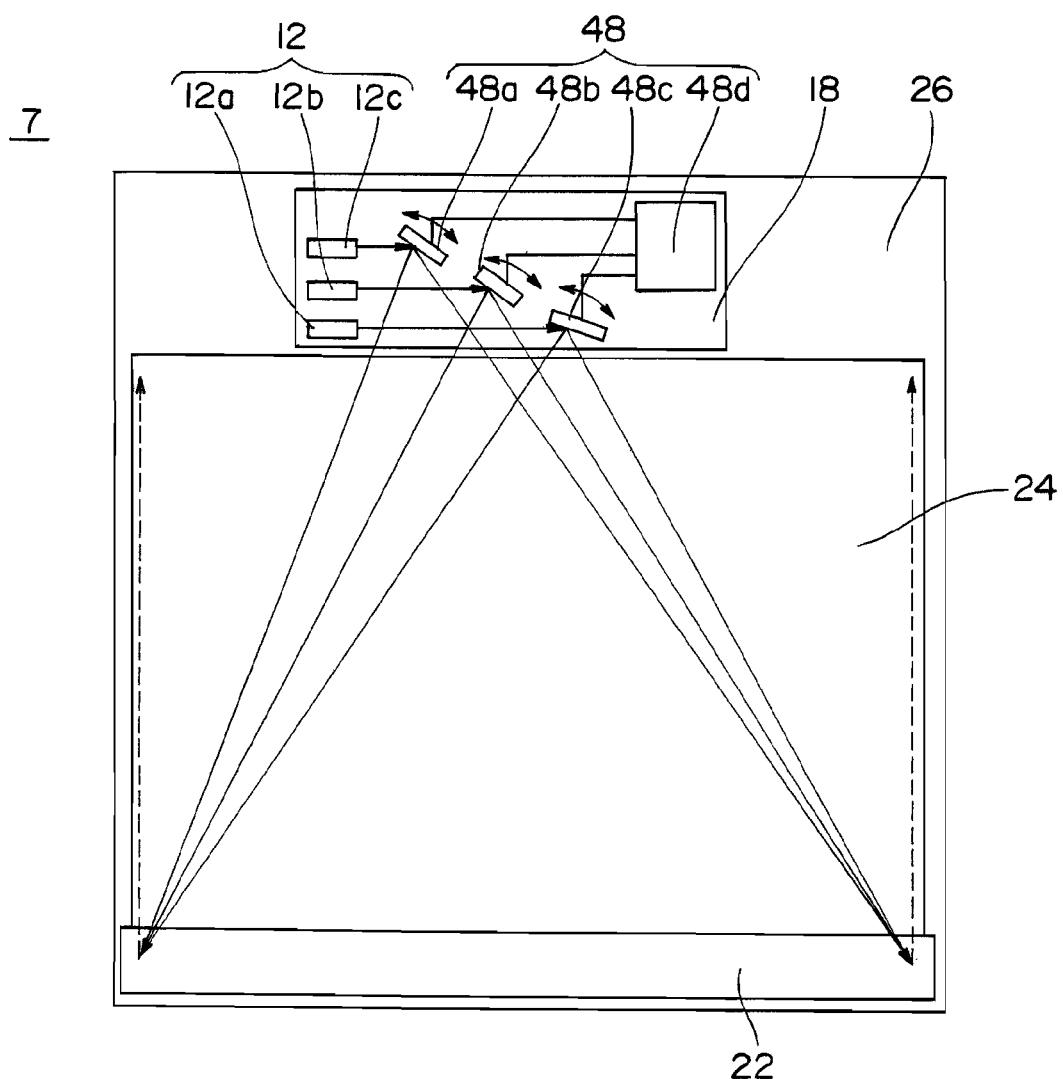
FIG. 9 is a schematic plan view illustrating a structure of a surface illuminator according to a sixth embodiment of the present invention.

FIG. 9 is a schematic plan view illustrating a structure of a surface illuminator 7 of a sixth embodiment of the present invention. The surface illuminator 7 is illustrated also, each surface of the casing 26 and housing 18 is cut out, thus making it possible to easily understand the internal structure.

The surface illuminator 7 has the reflection mirrors 48a, 48b, and 48c corresponding to the R-light source 12a, the G-light source 12b, and the B-light source 12c constituting the laser light source 12. These reflection mirrors 48a, 48b, and 48c can deflect and scan the laser beams with prescribed deflection scanning angles, so that the laser beams corresponding to each of the reflection mirrors can be caused to be incident on the entire length of the optical path conversion section 22. In addition, in a case of this surface illuminator 7, the laser beam is caused to be incident on the optical path conversion section 22 directly without disposing the second light guide plate, and the laser beam is caused to be incident on the first light guide plate 24 from the optical path conversion section 22. Other structure may be the same as that of the surface illuminator 1 of the first embodiment basically, and description thereof is omitted.

In a case of the surface illuminator 7, the reflection mirrors 48a, 48b, and 48c are provided for each of the R-light source 12a, the G-light source 12b, and the B-light source 12c constituting the laser light source 12. By these reflection mirrors 48a, 48b, and 48c, the laser beams are scanned according to the deflection angles set by the angle adjusting mechanism 48d. The beam scan section includes the laser light sources 12a, 12b, and 12c, reflection mirrors 48a, 48b, and 48c, and the angle adjusting mechanism 48d. Note that as described above, the reflection mirrors 48a, 48b, and 48c may be formed by forming a mirror using the silicon substrate with the MEMS technique. Further, for example, a mechanism of modulating the angle using a piezoelectric element may be constituted integrally with the reflection mirror. In FIG. 9, the B-light source 12a and the reflection mirror 48a, and the G-light source 12b and the reflection mirror 48b, and the B-light source 12c and the reflection mirror 48c are respectively disposed on same planes.

With the above-described structure, by simultaneously causing the R-light source 12a, the G-light source 12b, and the B-light source 12c to emit light to scan such light, mixed illumination light can be emitted from the first light guide plate 24. Alternatively, it is also possible to respectively emit light, by making a time-sequential difference in the emissions of the R-light source 12a, the G-light source 12b, and the B-light source 12c.

Figure 10:
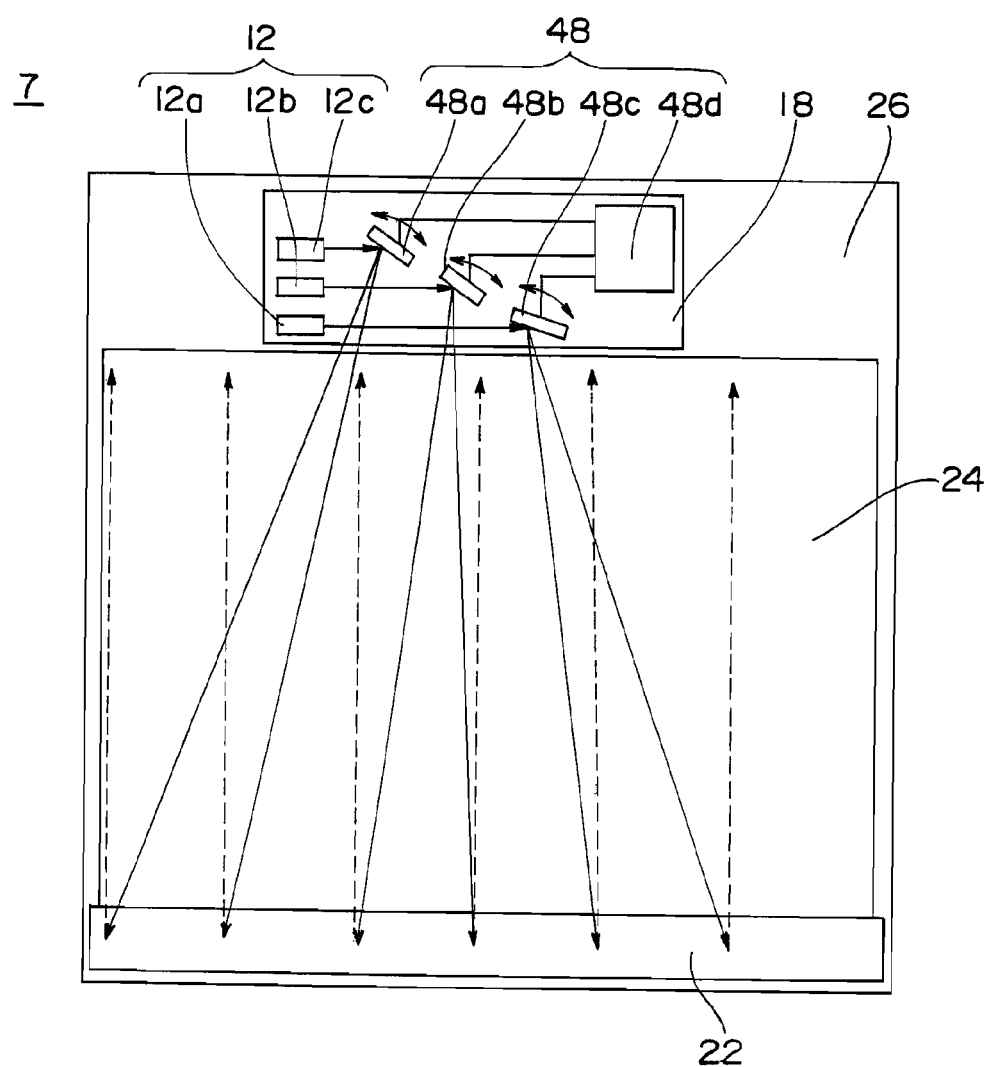
FIG. 10 is a diagram illustrating a situation where, by using the surface illuminator according to the sixth embodiment of the present invention, R-light, G-light, and G-light of laser beams are respectively scanned, and a light of each color is emitted from different regions on a major surface of the first light guide plate at the same time.

FIG. 10 is a diagram illustrating a situation in which, by using the surface illuminator 7 of the sixth embodiment, beam-scanning to the R-light, the G-light, and the B-light included in the laser beams is performed to the R-light, the G-light, and the B-light, respectively, so as to be emitted from different regions on the major surface of the first light guide plate 24 at the same time. In this case, the beam scan section 48 further has a control circuit (not shown) for controlling the angle adjusting mechanism 48d so as to emit the laser beams of each color of a plurality of colors emitted from the laser light source 12, from the different regions on the major surface of the first light guide plate 24 at the same time. When such control circuit is added, the R-light, the G-light, and the B-light can be respectively emitted simultaneously from the different regions of the first light guide plat 24 at the same time. Thus, there is no necessity for constituting each pixel of the liquid crystal display panel by, for example, R sub-pixel, G sub-pixel, and B sub-pixel as conventional, and a plurality of colors can be displayed by one pixel, by displaying a different color at a different time sequentially by the same pixel. Accordingly, if this surface illuminator 7 is used as the backlight illuminator, a color image can be displayed by using the liquid crystal display panel not provided with sub-pixels (for R, G, and B) as well as by using the liquid crystal display having a structure as illustrated in FIG. 3A and FIG. 3B. In this case, it is necessary to drive each pixel of the liquid crystal display panel in synchronization with the scanning of each laser beam emitted from the R-light source 12a, the G-light source 12b, and the B-light source 12c. Such drive of each pixel can be easily executed by controlling the aforementioned control circuit and the circuit of the liquid crystal display panel to be synchronized with each other.

Thus, when the laser beams are scanned so as to illuminate the different regions of the first light guide plate 24 at the same time, a field sequential type liquid crystal display is realized with the use of a scroll method. In this example (in which the scroll method is used), the regions for emitting the R-light, the G-light, and B-light in the first light guide plate 24 are differentiated at the same time, thus timewisely shifting these regions, to realize the field sequential type liquid crystal display. Note that sequential light emission by timewisely shifting the timing of the emission of the R-light, the G-light, and the B-light is not excluded in this scroll method. In this scroll method also, there is no necessity for one pixel to have the sub-pixels for R, G, and B, and therefore the structure of the pixel can be largely simplified. In addition, the color filter can also be eliminated, and therefore high luminance can be obtained. Particularly, like the present invention, when three colors of the B-light, the G-light, and the B-light are sequentially scanned in separate regions at the same time, the three colors are simultaneously displayed on a screen, unlike the field sequential method for sequentially lighting a monochromatic color. Therefore, generation of color braking can be alleviated.

Note that when the surface illuminators according to the first embodiment to the sixth embodiment are used as the backlight illuminator of the liquid crystal display, the structures of further various forms are possible. For example, by simultaneously causing the R-light source 12a, the G-light source 12b, and the B-light source 12c to emit light and scanning such light, the mixed illumination light can be emitted from the first light guide plate, and in addition, the R-light source 12a, the G-light source 12b, and the B-light source 12c can be sequentially lighted. By thus lighting, the field sequential type liquid crystal display is realized, and its structure can be significantly simplified. Also, the color filter can be eliminated, and therefore high luminance can be obtained.

Note that, in the first embodiment to the sixth embodiment, description is given for a case of using the three colors of the R-light source 12a, the G-light source 12b, and the B-light source 12c as the laser light source 12. However, the present invention is not limited thereto. The R-light source 12a, the G-light source 12b, and the B-light source 12c can be substituted with light sources of other colors, or further, the light source having a different wavelength can be added.

Seventh Embodiment

Figure 11A:
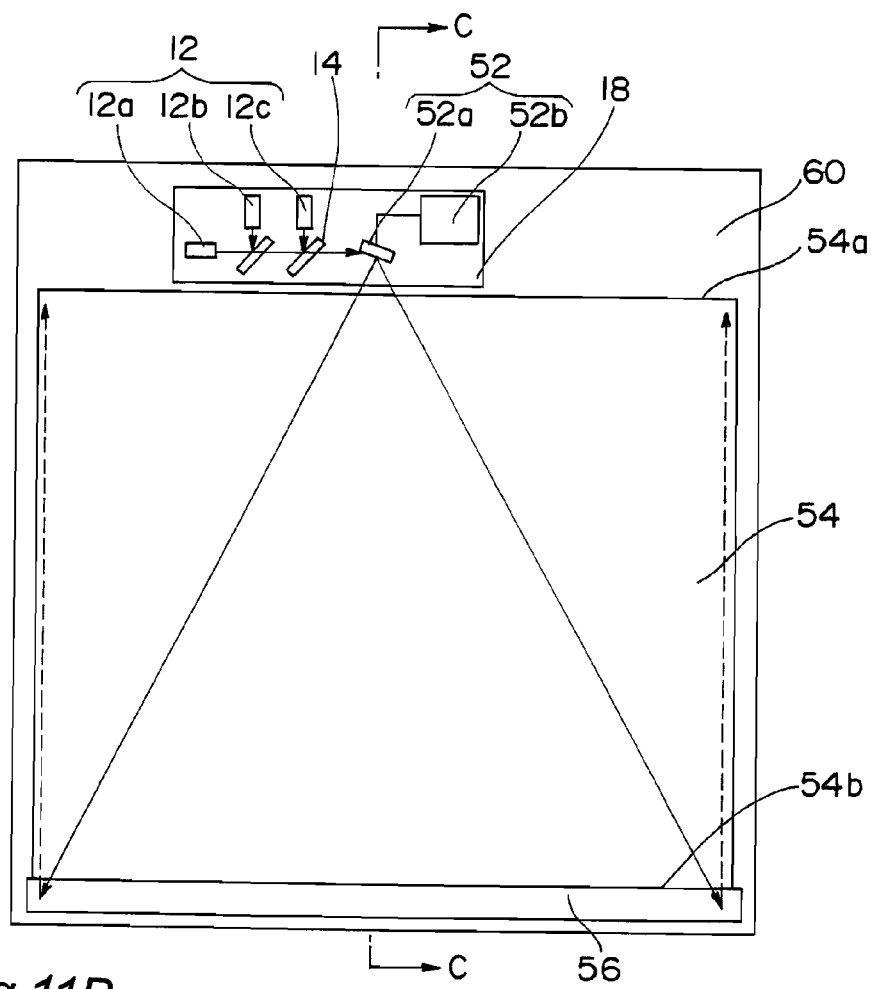
FIG. 11A is a plan view illustrating a liquid crystal display using a surface illuminator according to a seventh embodiment of the present invention as the backlight illuminator.
Figure 11B:
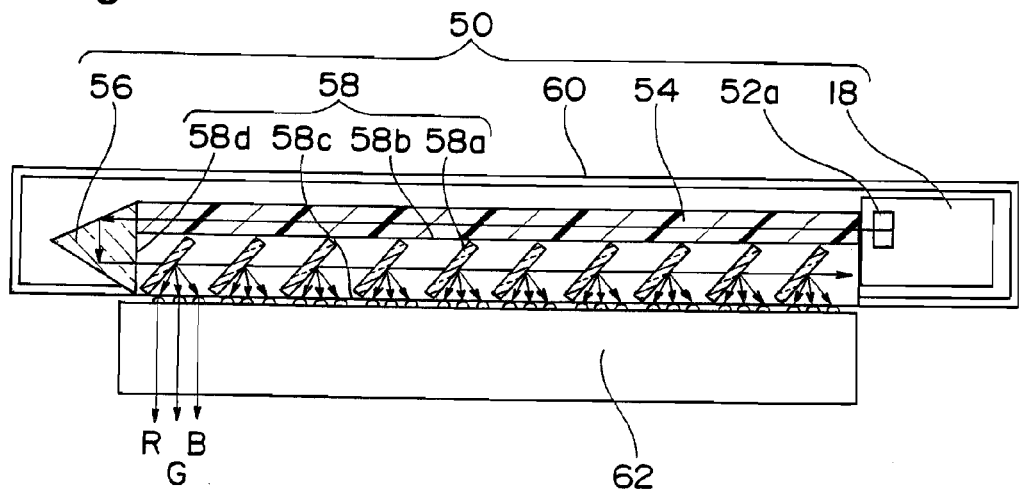
FIG. 11B is a schematic sectional view along the line C-C of FIG. 11A.
Figure 12A:
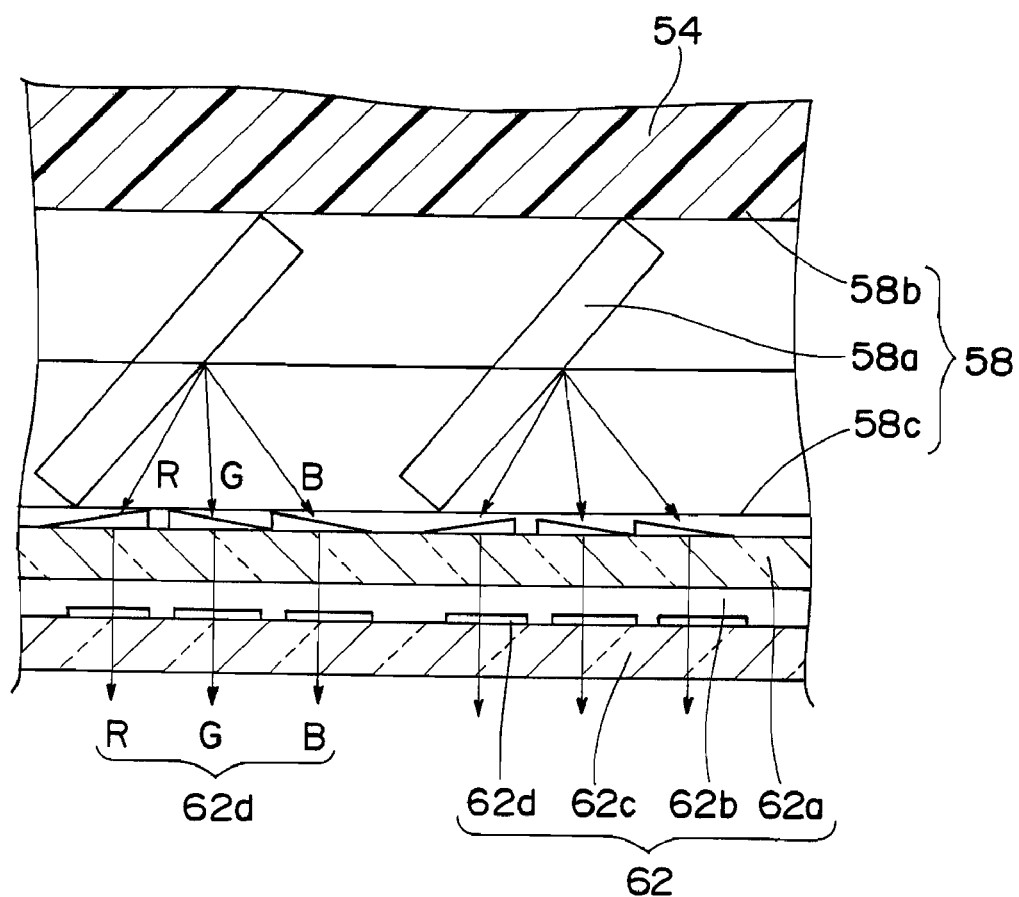
FIG. 12A is a partial sectional view of the liquid crystal display according to the seventh embodiment of the present invention.

FIG. 11A and FIG. 11B are diagrams illustrating a structure of a liquid crystal display using a surface illuminator 50 according to a seventh embodiment of the present invention as the backlight illuminator. The surface illuminators according to the seventh embodiment and an eighth embodiment as will be described later and the liquid crystal display using the same are capable of realizing a large screen display, capable of maintaining a uniform luminance of the screen even when the light source is deteriorated, and capable of saving the power consumption with a color separation mechanism for emitting each color to regions corresponding to the pixels of each colors of the liquid crystal display. FIG. 11A is a schematic plan view illustrating the liquid crystal display, and FIG. 11B is a schematic sectional view along the line C-C of FIG. 11A. FIG. 12A is an expanded sectional view illustrating a portion of the structure of the liquid crystal display. Note that, in FIG. 11A, each surface of the casing 60 and the housing 18 for housing the laser light source 12, the beam scan section 52 and the like is cut out, thus making it easy to understand the internal structure. In the seventh embodiment, the structure of the liquid crystal display will be mainly described. Therefore, the surface illuminator 50 according to the present invention will be described as a backlight illuminator 50 in some cases.

The liquid crystal display of the seventh embodiment includes a liquid crystal display panel 62, and the backlight illuminator 50 for lighting the liquid crystal display panel 62 from backside. The backlight illuminator 50 includes a laser light source 12, a beam scan section 52 for deflecting and scanning a laser beam emitted from the laser light source 12 at a prescribed deflection scanning angle; an optical path conversion section 56 for converting the optical path of the laser beam emitted from the beam scan section 52; and a first plate-shaped light guide 58 for emitting light from its major surface 58c.

Further, the backlight illuminator 50 may include a second light guide plate 54 for guiding the laser beam deflected and scanned by the beam scan section 52 to the optical path conversion section 56. Then, this second light guide plate 54 may be provided so as to laminate on another major surface 58b. In addition, the beam scan section 52 is disposed on one side of a end face portion 54a of the second light guide plate 54, and the optical path conversion section 56 is disposed on another end face portion 54b opposed to the end face portion 54a.

The first light guide plate 58 of the backlight illuminator 50 includes a plurality of hologram optical elements 58a arranged at a pitch corresponding to a pixel row of the liquid crystal display panel 62, wherein the laser beam incident on the first light guide plate 58 is subjected to color separation and diffraction by the hologram optical element 58a, and red light, green light, and blue light obtained after diffraction is emitted to the R sub-pixel, the G sub-pixel, and the B sub-pixel constituting a row of the pixel 62d of the liquid crystal display panel 62.

Further, in the seventh embodiment, the hologram optical elements 58a of the backlight illuminator 50 are disposed, so that the diffraction efficiency of the hologram optical elements 58a are gradually changed step by step from the incident surface side of the first light guide plate 58, namely from the end face portion 58d, along the propagation direction of the laser beam.

The liquid crystal display panel 62 may be a transmissive type or a semi-transmissive type, and, for example, may be a TFT active matrix type. As the liquid crystal display panel 62 of the seventh embodiment, it is preferable to use a panel, with the R sub-pixel, the G sub-pixel, and the B sub-pixel constituting the pixel 62d linearly arranged in a width direction or a length direction of the liquid crystal display panel 62. With such a pixel arrangement structure, it is possible to easily manufacture and arrange collectively the hologram optical elements arranged correspondingly to the pixel rows. In addition, in the liquid crystal display of the seventh embodiment, the color filter is not indispensable to the liquid crystal display panel 62. However, FIG. 11A and FIG. 11B, and FIG. 12A and FIG. 12B show the structure in which the color filter is provided.

As illustrated in FIG. 11A and FIG. 11B, a basic structure of the laser light source 12, the beam scan section 52 and the like of the backlight illuminator 50 of the liquid crystal display according to the seventh embodiment may be the same as that of the surface illuminator 3 of the third embodiment.

A lens (not shown) for collimating the emitted laser beam may also be disposed in the laser light source 12. Then, the laser beams from the laser light source 12 composed of the R-light source 12a, the G-light source 12b, and the B-light source 12c are multiplexed, for example, by the diachronic mirror 14. The beam scan section 52 includes, for example, the reflection mirror 52*a* and angle adjusting mechanism 52*b* manufactured by a technique such as MEMS described in the first embodiment. The reflection mirror 52*a* is caused to deflect and scan within a prescribed deflection scanning angle by this angle adjusting mechanism 52*b*. Thus, the laser beam can be caused to be incident over an entire length of the optical path conversion section 56 in the length direction. Note that, in order to suppress the speckle noise, it is preferable to dispose the diffusion plate on the side of the major surface 58*c* of the first light guide plate 58. Further, by the angle adjusting mechanism 52*b*, oscillation may be added to the deflection scanning direction also, at a minute angle. Thus, the speckle noise can be further suppressed.

The laser beam emitted from the beam scan section 52 is caused to be incident from the side of the end face portion 54*a* of the second light guide plate 54 so as to be incident on the optical path conversion section 56 disposed in the vicinity of the another end face portion 54*b*. As a material of the second light guide plate 54, the material described for the second light guide plate 20 of the first embodiment can be used. Note that this second light guide plate 54 may not be necessarily provided. Namely, the laser beam emitted from the beam scan section 52 is propagated through the air so as to be caused to be incident on the optical path conversion section 56. However, when dust or the like exists inside the casing 60, the laser beam is blocked, thereby posing a trouble that the luminance is deteriorated locally. By providing the second light guide plate 54, such a trouble can be prevented.

The optical path conversion section 56 has a shape including a concave surface or concave surface, so as to parallelize the advancing direction of the deflected and scanned laser beams. The laser beam is propagated through the first light guide plate 58 as almost parallelized beam by the optical path conversion section 56. By almost parallelizing the laser beams, mixture of beams of each colors can be suppressed in the color separation in the hologram optical elements 58*a*. In addition, it becomes possible to easily design the launching element such as the hologram optical element 58*a*.

As illustrated in FIG. 12A, the hologram optical elements 58*a* provided in the laser optical path of the first light guide plate 58 are arranged at a pitch corresponding to the pixel rows. The laser beams propagated through the first light guide plate 58 are partially subjected to color separation and diffraction, and are emitted from the major surface 58*c* of the first light guide plate 58 as the R-light, the G-light, and the B-light. Then, remaining laser beams are transmitted through one hologram optical element 58*a*, and are caused to be incident on the next hologram optical element 58*a*. In the hologram optical element also, to which the laser beams are incident next, in the same way as described above, the laser beams are partially subjected to diffraction and color separation, so as to be separated into laser beams emitted from the major surface 58*c* of the first light guide plate 58, and laser beams transmitted through the hologram optical element 58*a*. Thus, the laser beams are partially subjected to color separation and diffraction sequentially from the hologram optical element closest to the optical path conversion section 56 and are emitted from the major surface 58*c* of the first light guide plate 58, and the remaining laser beams are transmitted thorough one hologram optical element and are caused to be incident on the next hologram optical element. Therefore, the diffraction efficiency of the hologram optical element 58*a* is gradually changed step by step from the side of the incident surface of the first light guide plate 58, namely from the end face portion 58*d*, along the propagation direction of the laser beams. Thus, it is possible to obtain the R-light, the G-light, and the B-light having a uniform luminance over an entire surface of the first light guide plate 58.

As the hologram optical element 58*a*, it is possible to use a phase type volume hologram optical element or the like formed by, for example, an interference exposure using the a laser beam, and formed with a pattern corresponding to the pixel rows constituted of the R sub-pixel, the G sub-pixel, and the B sub-pixel. Note that the hologram optical element 58*a* is not necessarily provided with the pattern formed in a row shape, but having a pattern corresponding to an arrangement pattern of the pixels.

In addition, the first light guide plate 58 and the liquid crystal display panel 62 are aligned and disposed so that the aforementioned R-light, the G-light, and the B-light are incident on the R sub-pixel, the G sub-pixel, and the B sub-pixel constituting the pixel 62*d* of the liquid crystal display panel 62, correspondingly to each sub-pixel.

Meanwhile, the liquid crystal display panel 62 of the seventh embodiment is provided with a liquid crystal 62*b* between two glass substrates 62*a* and 62*c*, and the TFT not shown for driving this liquid crystal 62*b* is formed in one of the glass substrates 62*a* and 62*c*. Preferably, this liquid crystal display panel 62 has a structure in which the R sub-pixel, the G sub-pixel, and the B sub-pixel constituting the pixel 62*d* are arranged in a row shape. Its structure is not limited in other points, and the liquid crystal display panel of a conventional structure can be used.

The laser beam propagated through the first light guide plate 58 is diffracted by the hologram optical element 58*a*, and is subjected to color separation respectively into the R-light, the G-light, and the B-light correspondingly to the row of the pixel 62*d*. At this time, preferably, the R-light, the G-light, and the B-light are diffracted in each row direction, correspondingly to the row of the R sub-pixel, the G sub-pixel, and the B sub-pixel constituting the row of the pixel 62*d* of the liquid crystal display panel 62. Here, the "row" may be a direction vertical to the figure. The R-light, the G-light, and the B-light diffracted in mutually different three directions are transmitted through, for example, a microlens 64 provided between the major surface 58*c* and the glass substrate 62*a* of the liquid crystal display panel 62, thereby being formed into parallel beams, and then are caused to be incident on the corresponding R sub-pixel, the G sub-pixel, and the B sub-pixel of the liquid crystal display panel 62.

Note that the laser beams transmitted through the microlens 64 is not required to be exactly parallel, and may have a certain degree of angle distribution. Further, when the color filter is provided, the microlens 64 is not necessarily provided. This microlens 64 may be constituted of a prism sheet and a lens sheet.

With the above-described structure, each hologram optical element 58*a* functions as a launching element, and the laser beams are guided thereby to the major surface 58*c*. An entire surface of the display surface of the liquid crystal display panel 62 is lighted with a uniform luminance by the laser beams diffracted in the hologram optical element 58*a* and subjected to color separation into the R-light, the G-light, and the B-light light, from the first major surface. Therefore, the surface illuminator 50 is capable of lighting the liquid crystal display panel 62 with a uniform luminance. Further, the laser beams subjected to color separation, for each R sub-pixel, the G sub-pixel, and the B sub-pixel, are caused to be incident on the liquid crystal display panel 62 of the liquid crystal display using this surface illuminator 50 as the backlight illuminator. Therefore, the liquid crystal display having excellent color purity and expanded color reproduction range and high quality can be realized. Note that the color filter can be eliminated, thereby making it possible to further increase the luminance.

Note that, in the seventh embodiment, description has been given for the structure of using the reflection mirror 52a in the beam scan section 52. However, the cylindrical lens, the lenticular lens or the like may be used in the beam scan section 52.

Figure 12B:
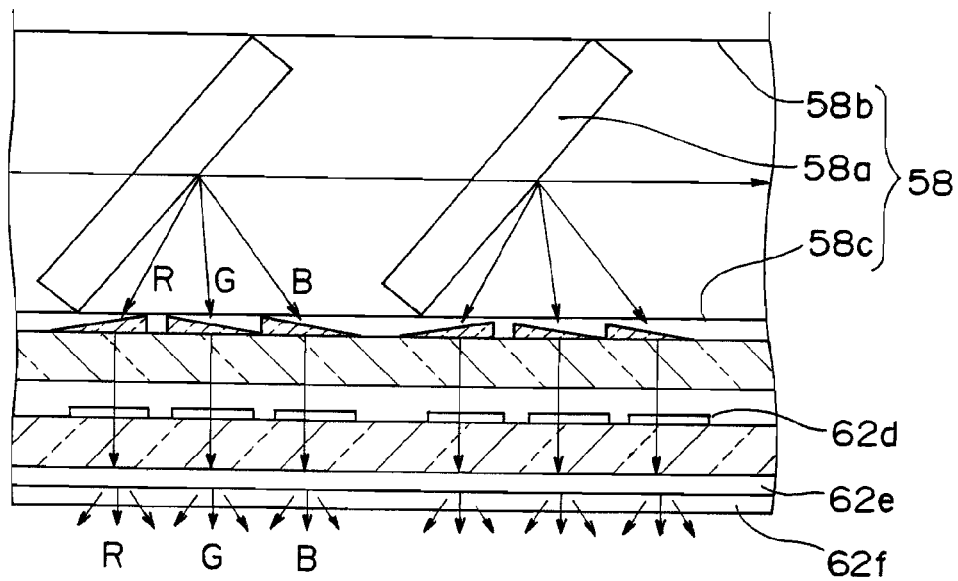
FIG. 12B is a partial sectional view of a modification of a liquid crystal display according to the seventh embodiment of the present invention.

FIG. 12B is a diagram illustrating a liquid crystal display panel according to a modification of the seventh embodiment. The liquid crystal display panel illustrated in FIG. 12B is different from the liquid crystal display panel 62 illustrated in FIG. 12A in the point that a diffusion plate 62e is provided on the side being closer to a viewer rather than the pixel 62d of the liquid crystal display panel 62. When the laser beams incident on the pixel 62d have a diffusion angle of a certain specific angle or more at the time of using the backlight illuminator according to the present invention, the laser beams are caused to be incident on the sub-pixel of a color different from the laser beams, making it as a loss. Therefore, at a time point of making the laser beams to be incident on the pixel 62d, the laser beams are preferably almost parallelized and made incident on the pixel 62d. However, when the laser beams are remained to be almost parallelized at the time point after transmitting through the pixel 62d, there occurs a problem that a visual angle of the liquid crystal display becomes narrower. Therefore, in the liquid crystal display panel according to the present invention, it is preferable to have a structure for expanding the visual angle. In the liquid crystal display panel illustrated in FIG. 12B, the diffusion plate, the lens sheet, or the prism sheet is provided on the side being closer to the viewer rather than the pixel 62d, thus expanding the visual angle. Particularly, it is preferable to dispose the diffusion plate 62e, (or the lens sheet, or the prism sheet) between a liquid crystal layer and an emission side deflection plate 62f constituting the liquid crystal display panel. When the diffusion plate 62e, (or the lens sheet, or the prism sheet) is disposed on the side of the viewer rather than the side of the pixel 62d, external light is captured, thus involving a problem that a bright light place contrast (photopic contrast) is deteriorated. However, the bright light place contrast can be improved, by disposing the emission side deflection plate 62f further on the side of the viewer rather than the side of the diffusion plate 62e, thereby blocking the external light.

Eighth Embodiment

Figure 13A:
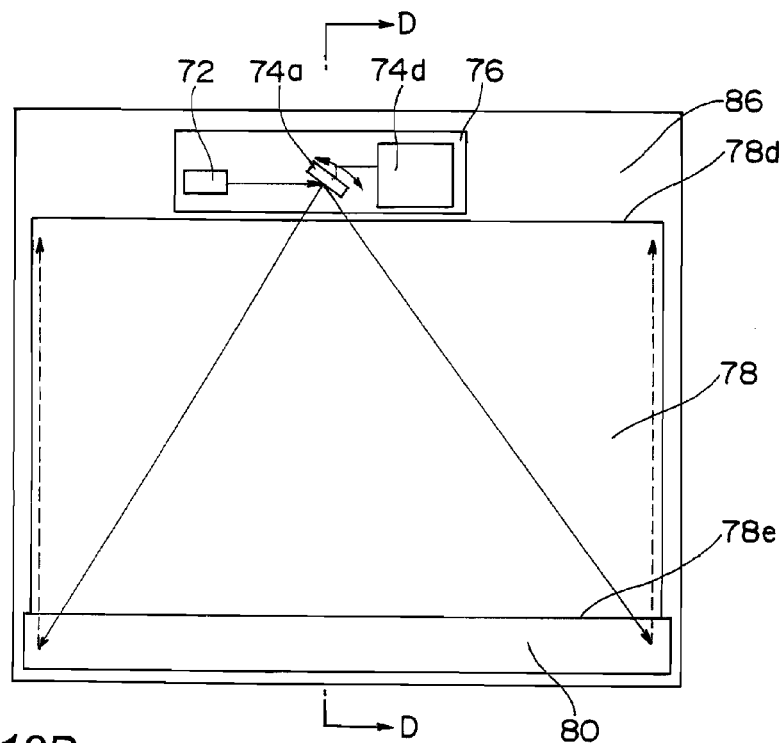
FIG. 13A is a schematic plan view illustrating a structure of a liquid crystal display using a surface illuminator according to an eighth embodiment of the present invention as a backlight illuminator.
Figure 13B:
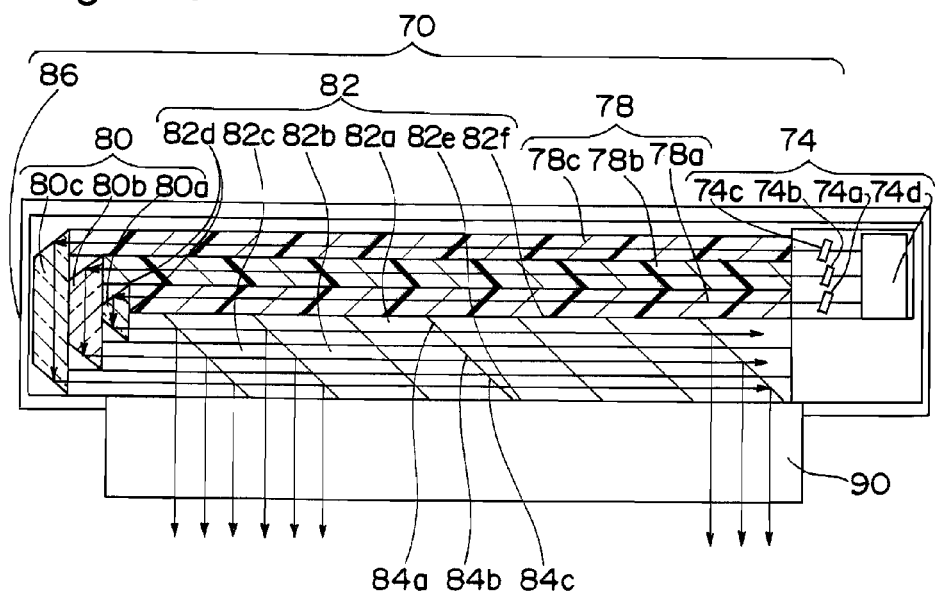
FIG. 13B is a schematic sectional view along the line D-D of FIG. 13A.
Figure 14:
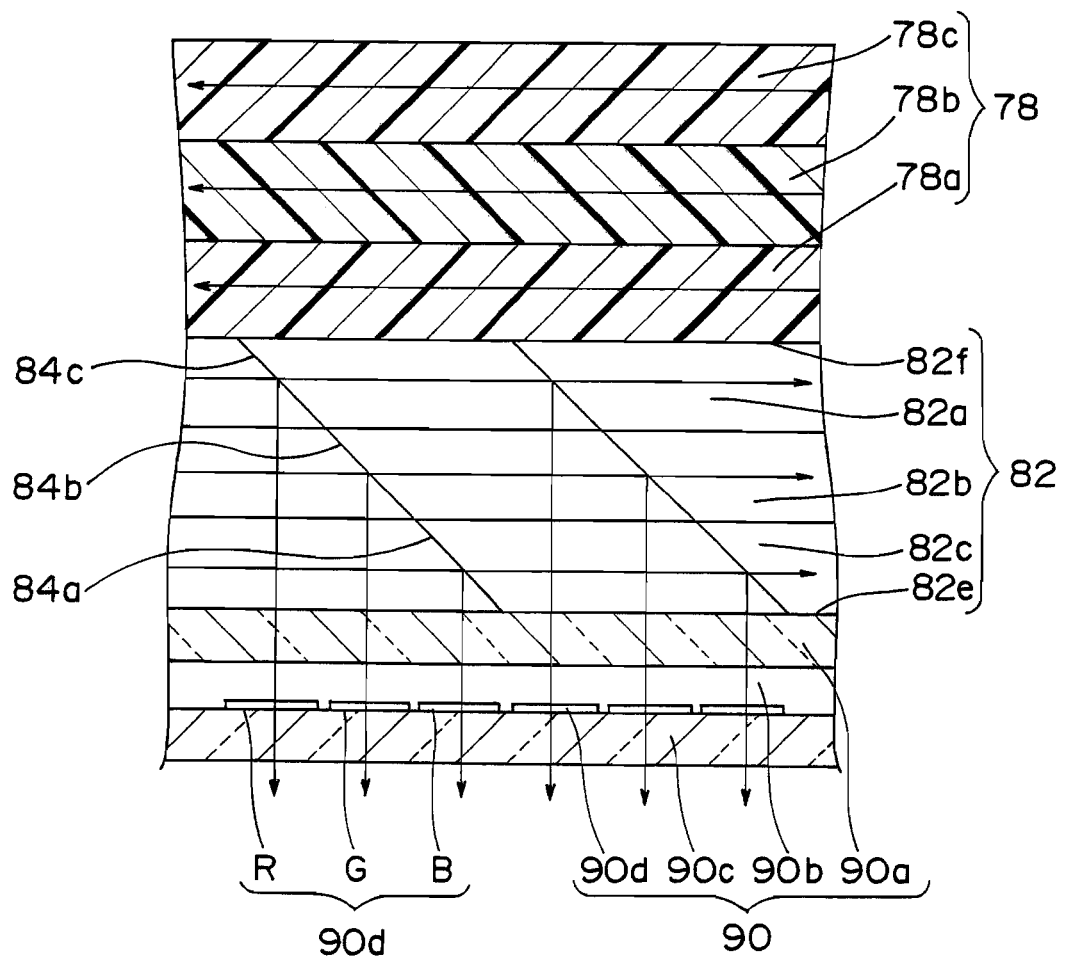
FIG. 14 is a partial sectional view of the liquid crystal display according to the eighth embodiment of the present invention.

FIG. 13A and FIG. 13B are diagrams illustrating a schematic structure of a liquid crystal display using a surface illuminator 70 according to an eighth embodiment of the present invention as a backlight illuminator. FIG. 13A is a plan view, and FIG. 13B is a sectional view along the line D-D of FIG. 13A. In addition, FIG. 14 is an expanded sectional view illustrating a portion of this structure. Note that, in FIG. 13A, each surface of a casing 86 of the backlight illuminator and a housing 76 for housing a laser light source 72 and a beam scan section 74 is cut out, thus making it easy to understand the internal structure. In addition, in the eighth embodiment, the structure of the liquid crystal display will be mainly described. The surface illuminator 70 of the present invention is referred to as a backlight illuminator 70 in some cases, for convenience of description.

In the same ways as the liquid crystal display of the seventh embodiment, the liquid crystal display of the eighth embodiment includes a liquid crystal display panel 90, and the backlight illuminator 70 for lighting the liquid crystal display panel 90 from backside. The backlight illuminator 70 includes the laser light source 72, the beam scan section 74 for deflecting and scanning the laser beam emitted from the laser light source 72 in a prescribed deflection scanning angle, an optical path conversion section 80 for converting the optical path of the laser beam emitted from the beam scan section 74, and a first plate-shaped light guide 82 for making the laser beam of which optical path is converted by the optical path conversion section 80 to be incident from an end face portion 82d and making the incident laser beam to emit from a major surface 82e.

In addition, the backlight illuminator 70 further includes a second light guide plate 78 for guiding the laser beam deflected and scanned by the beam scan section 74 to the optical path conversion section 80. The second light guide plate 78 is provided so as to laminate on another major surface 82f of the first light guide plate 82. Then, the beam scan section 74 is disposed in the vicinity of the side of the end face portion 78d of the second light guide plate 78, and the optical path conversion section 80 is disposed in the vicinity of the another end face portion 78e opposed to the end face portion 78d.

Further, the beam scan section 74 of the backlight illuminator 70 includes an angle adjusting mechanism 74d having reflection mirrors 74a, 74b, and 74c, for deflecting and scanning the laser beam by respectively changing the angle of the reflection mirrors 74a, 74b, and 74c in a prescribed deflection scanning angle.

The first light guide plate 82 of the backlight illuminator 70 includes a plurality of sub-light guide plates (sub-light guides) 82a, 82b, and 82c disposed by the number corresponding to the number of light sources having each different wavelength of the laser light source. A plurality of semi-transmissive mirrors 84a, 84b, and 84c are arranged in these sub-light guides 82a, 82b, and 82c at a pitch corresponding to the row of a pixel 90d (see FIG. 14) of the liquid crystal display panel 90. Then, the laser beams incident on the first light guide plate 82 are partially reflected by these semi-transmissive mirrors 84a, 84b, and 84c toward the major surface 82e of the first light guide plate 82. In this case, the laser beams of each color are respectively emitted correspondingly to the R sub-pixel, the G sub-pixel, and the B sub-pixel constituting the pixel 90d of the liquid crystal display panel 90.

Note that regarding the semi-transmissive mirrors 84a, 84b, and 84c, the reflectances of the semi-transmissive mirrors 84a, 84b, and 84c are differentiated at a specific ratio, along the propagation direction of the laser beams from the incident surface of the first light guide plate 82, namely from the side of the end face portion 82d.

The liquid crystal display panel 90 may be a transmissive type or a semi-transmissive type, and for example, may be a TFT active matrix type. However, in the liquid crystal display panel 90 of the eighth embodiment, preferably the R sub-pixel, the G sub-pixel, and the B sub-pixel constituting the pixel 90d are linearly arranged in the width direction or the length direction of the liquid crystal display panel 90. In addition, in the liquid crystal display of the eighth embodiment, although the color filter is not required to be disposed in the liquid crystal display panel 90, the structure of disposing the color filter will be illustrated in FIG. 13A, FIG. 13B, and FIG. 14.

According to the eighth embodiment, in the laser light source 72 composed of the R light source, the G light source, and the B light source, each laser beam is not multiplexed, but is caused to be incident on the second light guide plate 78 via each separate reflection mirrors 74a, 74b, and 74c. The laser light source 72 and the reflection mirrors 74a, 74b, and 74c may have the same structures basically as those of the surface illuminator 7 of the sixth embodiment. However, in the eighth embodiment, the second light guide plate 78 is disposed to laminate in a thickness direction of the first light guide plate 82, so that the sub-light guides 78a, 78b, and 78c correspond to the reflection mirrors 74a, 74b, and 74c. The laser light source 72 is constituted of the R light source, the G light source, and the B light source, and the reflection mirrors 74a, 74b, and 74c are disposed so as to correspond to these R light source, the G light source, and the B light source. Further, the angle adjusting mechanism 74d for driving the reflection mirrors 74a, 74b, and 74c is disposed. The beam scan section 74 is thus constituted. The structure of them is basically the same as that of the surface illuminator as described above, and therefore further description thereof is omitted.

The laser beam emitted from the laser light source 72 composed of the R light source, the G light source, and the B light source is subjected to deflection scanning at a specific deflection angle, and is caused to be incident on the sub light guide plates 78a, 78b, and 78c of the second light guide plate 78 respectively.

The laser beam incident on the sub-light guides 78a, 87b, and 78c respectively is caused to be incident on the optical path conversion section 80 in a state of being separated into the R light, the G light, and the B light (without being multiplexed). Each laser beam is deflected by 180 degrees by the optical path conversion section 80 and is caused to be incident on the sub-light guides 82a, 82b, and 82c of the first light guide plate 82. Namely, the R light incident on the sub-light guide 78a of the second light guide plate 78 is deflected by the optical path conversion section 80a, and is caused to be incident on the sub-light guide 82a of the first light guide plate 82. In addition, the G light incident on the sub-light guide 78b of the second light guide plate 78 is deflected by the optical path conversion section 80b and is caused to be incident on the sub-light guide 82b of the first light guide plate 82. Similarly, the B light incident on the sub light guide plate 82c of the second light guide plate 78 is deflected by the optical path conversion section 80c and is caused to be incident on the sub-light guide 82c of the first light guide plate 82.

The semi-transmissive mirrors 84a, 84b, and 84c are provided in an aligned arrangement in the sub-light guides 82a, 82b, and 82c of the first light guide plate 82, correspondingly to the R sub-pixel, the G sub-pixel, and the B sub-pixel constituting the pixel 90d of the liquid crystal display panel 90.

The R light, the G light, and the B light propagated through the sub light guide plates 82a, 82b, and 82c of the first light guide plate 82 are partially reflected by the semi-light-transmitting-mirrors 84a, 84b, and 84c, and the remaining light is transmitted through these mirrors. The transmitted laser beams are caused to be incident on the next semi-transmissive mirror, and similarly are partially reflected and the remaining light is transmitted through those mirrors. The reflected B-light, G-light, and B-light are caused to be incident on the liquid crystal display panel 90 from the major surface 82e of the first light guide plate 82.

The semi-transmissive mirrors 84a, 84b, and 84c are disposed in a row shape at a pitch corresponding to the R sub-pixel, the G sub-pixel, and the B sub-pixel constituting the pixel 90d of the liquid crystal display panel 90. Accordingly, the R-light, the G-light, and the B-light reflected by these semi-light-transmissive-mirrors 84a, 84b, and 84c are respectively caused to be incident on the corresponding R sub-pixel, G sub-pixel, and B sub-pixel. Thus, the liquid crystal display having the excellent color purity and color reproduction range, and high image quality can be realized.

Note that, in the case of the eighth embodiment, it is not necessary to dispose the color filter for forming the R sub-pixel, the G sub-pixel, and the B sub-pixel. However, by disposing the color filter, leakage of the light between the adjacent sub-pixels can be blocked, thus making it possible to further improve the color purity.

In addition, the diffusion plate may be disposed on either surface of a viewer side of the liquid crystal display panel 90 or the side of the major surface 82e of the first light guide plate 82. When the diffusion plate is thus disposed, the speckle noise can be suppressed.

Note that the semi-transmissive mirrors 84a, 84b, and 84c can be manufactured by providing a multilayer film formed by laminating dielectric material films on a face inclined at about 45 degrees being provided in the sub-light guides 82a, 82b, and 82c of the first light guide plate 82. Specifically, for example, the multilayer film can be manufactured as follows. First, by using a transparent resin such as acrylic, a triangular prism is formed, with a sectional face formed in a rectangular isosceles triangle having a length corresponding to each sub-pixel of the liquid crystal display panel 90. Next, the aforementioned multilayer film is formed on the surface of a long side part of this triangular prism. Thereafter, the long side part of the multilayer film formation triangular prism on which the multilayer film is formed, and a triangular prism of the same shape as that of the multilayer film formation triangular prism are bonded to each other by an adhesive agent consisting of the same material such as acrylic. By repeating this procedure, it is possible to obtain a first plate-shaped light guide 82 having the semi-transmissive mirror disposed at a position corresponding to the sub-pixel. However, the aforementioned manufacturing method is given as an example and further manufacturing methods may be adopted.

With the above-described structure, the occurrence of the speckle noise can be prevented, while using the laser light source as the light source. Therefore, the R-light, the G-light, and the B-light without interference intensity unevenness can be respectively caused to be incident on the R sub-pixel, the G sub-pixel, and the B sub-pixel to form the image. Accordingly, it is possible to realize the liquid crystal display of high image quality, having high light use efficiency, excellent color purity, and an expanded color reproduction range. Note that the color filter can be eliminated, and therefore the luminance can be further improved.

In addition, in the eighth embodiment, the case where the reflection mirrors 74a, 74b, and 74c are used as the beam scan section 52 has been described, however the cylindrical lens or the lenticular lens can also be used.

In addition, in the seventh embodiment and the eighth embodiment, the case where three colors of the B-light source 12a, the G-light source 12b, and the B-light source 12c are used has been described, however the present invention is not limited thereto. Further, the light source having a different wavelength from them may be added.

In addition, in the seventh and eighth embodiments, description has been given for the structures of using the hologram optical elements as the launching element and using the sub-light guide and the semi-transmissive mirror as the launching element. However, other structures can be adopted.

For example, sub-light guides and prism surfaces formed on each of the sub-light guides and the like can also be used.

In addition, the present invention is not limited to the structures of the first to eighth embodiments, and other various structures can be taken.

For example, a reflection layer having irregularity for emitting the laser beam toward the major surface may also be disposed on the side of the another major surface of the first light guide plate. By disposing such reflection layer, a luminance distribution of the laser beam emitted from the major surface can be made further uniform.

The surface illuminator according to the present invention and the liquid crystal display using the same are capable of preventing the occurrence of the speckle noise and realizing the surface illuminator having a uniform luminance in a surface, by time-sequentially deflecting and scanning the laser beam at a prescribed deflection scanning angle. By using this surface illuminator, the liquid crystal display of high image quality can be realized with high luminance. Therefore, the present invention is useful in a display field.

The invention claimed is:

1. A surface illuminator comprising:
   a laser light source that emits a laser beam;
   a beam scan section that deflects and scans the laser beam;
   a first plate-shaped light guide that has an end face portion and a first major surface, and that causes the laser beam which is deflected and scanned by said beam scan section to be incident from the end face portion and causes the incident laser beam to emit from the first major surface; and
   an optical path conversion section that receives the laser beam emitted from said beam scan section without leakage, then converts an optical path of the laser beam, and emits the received laser beam to said first light guide without leakage,
   wherein the laser beam emitted from the optical path conversion section is incident to said first light guide from its end face portion and is emitted from the first major surface.

2. The surface illuminator according to claim 1, further comprising:
   a second plate-shaped light guide that receives the laser beam emitted from said beam scan section without leakage and guides the received laser beam to said optical path conversion section without leakage, wherein
   the second light guide is provided to laminate on a second major surface of said first light guide which is different from the first major surface of said first light guide;
   said beam scan section and said optical path conversion section are disposed in the vicinity of an end face portion of said second light guide;
   said beam scan section causes the deflected and scanned laser beam to be incident one the end face portion of said second light guide; and
   said optical path conversion section receives the laser beam emitted from the end face portion of said second light guide without leakage.

3. The surface illuminator according to claim 1, wherein said first light guide includes a deflection sheet on the first major surface that deflects an advancing direction of the laser beam.

4. The surface illuminator according to claim 3, wherein said deflection sheet includes at least any one of a diffusion plate, a lens sheet, and a prism sheet.

5. The surface illuminator according to claim 1, wherein said beam scan section includes a reflection mirror that reflects the laser beam, and an angle adjusting mechanism that changes an angle of said reflection mirror, and by changing the angle of the reflection mirror by said angle adjusting mechanism, the laser beam is deflected and scanned.

6. The surface illuminator according to claim 1, comprising:
   at least one of a cylindrical lens and a lenticular lens; and
   a reciprocally moving mechanism that reciprocally moves said at least one of the cylindrical lens and lenticular lens in a direction parallel to the end face portion of said first light guide, wherein
   the deflection scanning is executed by the reciprocal movement of said at least one of the cylindrical lens and lenticular lens, and
   said at least one of the cylindrical lens and lenticular lens changes a deflection direction of the laser beam in time sequence such that the laser beam has a uniform light intensity distribution.

7. The surface illuminator according to claim 1, wherein said beam scan section includes an optical element that expands the laser beam in a direction parallel to the first major surface of said first light guide.

8. The surface illuminator according to claim 1, further comprising:
   a vertical angle oscillation mechanism that oscillates an emission angle of the laser beam in a direction vertical to said first major surface of said first light guide, wherein
   the deflection scanning is executed by oscillation of the emission angle by said vertical angle oscillation mechanism.

9. The surface illuminator according to claim 1, wherein said optical path conversion section includes an optical element that almost parallelizes an advancing direction of the incident laser beam.

10. The surface illuminator according to claim 1, wherein said laser light source includes a light source that emits a red laser beam, a green laser beam, and a blue laser beam at least, and said laser light source multiplexes the red laser beam, the green laser beam, and the blue laser beam and emits the multiplexed beams to said beam scan section.

11. The surface illuminator according to claim 1, wherein said light source includes a light source that emits laser beams having wavelengths different from one another and including a red laser beam, a green laser beam, and a blue laser beam at least, and said beam scan section individually deflects and scans the laser beams having the wavelengths different from one another.

12. The surface illuminator according to claim 11, wherein said beam scan section further includes a controlling section that controls the individual deflection by said beam scan section,
   said controlling section controls the individual deflection such that the laser beams of the wavelengths different from one another are propagated through mutually different regions of said first light guide at the same time and each of the laser beams of the wavelengths different from one another is propagated through a common region of said first light guide at different times.

13. A liquid crystal display comprising a liquid crystal display panel and a backlight illuminator that lights said liquid crystal display panel from a back surface side, said backlight illuminator including:
   a laser light source that emits a laser beam;
   a beam scan section that deflects and scans the laser beam; and
   a first plate-shaped light guide that has an end face portion and a first major surface, and that causes the laser beam which is deflected and scanned by said beam scan section to be incident from the end face portion and causes the incident laser beam to emit from the first major surface, wherein said first major surface of said first light guide of said backlight illuminator and said liquid crystal display panel are disposed closely in contact with each other, and the laser beam emitted from said first major surface lights said liquid crystal display panel.

14. The liquid crystal display according to claim 13, wherein said backlight illuminator further comprises an optical path conversion section that receives the laser beam emitted from said beam scan section without leakage, then converts an optical path of the laser beam, and emits the received laser beam to said first light guide without leakage, and said first light guide causes the laser beam which is emitted from said optical path conversion section to be incident from said end face portion and causes the incident laser beam to emit from said first major surface.

15. The liquid crystal display according to claim 14, wherein said backlight illuminator further comprises a second plate-shaped light guide that receives the laser beam which is emitted from said beam scan section without leakage and guides the received laser beam to said optical path conversion section without leakage;

said second light guide is disposed to laminate on a second major surface of said first light guide which is different from said first major surface of said first light guide;

said beam scan section and said optical path conversion section are disposed in the vicinity of said end face portion of said second light guide;

said beam scan section causes the deflected and scanned laser beam to be incident one said end face portion of said second light guide; and said optical path conversion section receives the laser beam which is emitted from said end face portion of said second light guide without leakage.

16. The liquid crystal display according to claim 13, wherein said first light guide includes a deflection sheet that deflects an advancing direction of the laser beam to said first major surface.

17. The liquid crystal display according to claim 16, wherein said deflection sheet includes at least any one of a diffusion plate, a lens sheet, and a prism sheet.

18. The liquid crystal display according to claim 14, wherein said optical path conversion section further includes an optical element that almost parallelizes an advancing direction of the incident laser beam.

19. The liquid crystal display according to claim 13, wherein a second major surface of said first light guide of said backlight illuminator includes a reflection surface having irregularity that reflects the laser beam and causes the laser beam to emit from said first major surface.

20. The liquid crystal display according to claim 13, wherein said beam scan section includes a reflection mirror that reflects the laser beam and an angle adjusting mechanism that changes an angle of said reflection mirror, and said angle adjusting mechanism changes the angle of said reflection mirror and deflects and scans the laser beam.

21. The liquid crystal display according to claim 13, wherein said beam scan section further includes a vertical angle oscillation mechanism that oscillates an emission angle of the laser beam in a direction vertical to said first major surface, and the deflection scanning is executed by oscillation of the emission angle by said vertical angle oscillation mechanism.

22. The liquid crystal display according to claim 13, wherein said beam scan section includes at least one of a cylindrical lens and a lenticular lens, and a reciprocally moving mechanism that reciprocally moves said at least one of the cylindrical lens and the lenticular lens in a direction parallel to said end face portion of said first light guide, and the deflection scanning is executed by the reciprocal movement of said at least one of the cylindrical lens and lenticular lens, said at least one of the cylindrical lens and lenticular lens changes a deflection direction of the laser beam in time sequence such that the laser beam has a uniform light intensity distribution.

23. The liquid crystal display according to claim 13, said liquid crystal display panel includes a pixel, wherein said pixel includes a plurality of sub-pixels that display colors different from one another, and said first light guide includes a launching element that emits a laser beam from said first major surface to said sub-pixels corresponding to each color to be displayed by said sub-pixels.

24. The liquid crystal display according to claim 13, wherein said laser bean source includes a light source that emits a red laser beam, a green laser beam, and a blue laser beam at least; and said laser light source multiplexes the red laser beam, green laser beam, and blue laser beam, and emits the multiplexed laser beam to said beam scan section.

25. The liquid crystal display according to claim 13, wherein said laser light source includes a light source that emits laser beams having wavelengths different from one another, including a red laser beam, a green laser beam and a blue laser beam at least, and said beam scan section deflects and scans each laser beam having the wavelengths different from one another.

26. The liquid crystal display according to claim 25, wherein said beam scanning section further includes a controlling section that controls the individual deflection by said beam scan section, said controlling section controls the individual deflection such that the laser beams of the wavelengths different from one another are propagated through mutually different regions of said first light guide at the same time and each of the laser beams of the wavelengths different from one another is propagated through a common region of said first light guide at different times.

27. The liquid crystal display according to claim 26, wherein said pixel of said liquid crystal display panel is one of a plurality of pixels, each of said pixels causes a laser beam to be incident thereon at a first time, which has a first wavelength and is included in the laser beams having wavelengths different from one another, and causes a laser beam to be incident thereon at a second time, which has a second wavelength and is included in the laser beams having wavelengths different from one another, and one pixel of said pixels displays a plurality of colors.

28. The liquid crystal display according to claim 13, said liquid crystal display panel includes a pixel, wherein at least any one of a diffusion plate, a lens sheet, and a prism sheet is provided on a lower stream side of said pixel along an advancing direction of the laser beam.

* * * * *